US012481111B1

(12) United States Patent
Chang et al.

(10) Patent No.: US 12,481,111 B1
(45) Date of Patent: Nov. 25, 2025

(54) FIELD REPLACEABLE OPTICAL CONNECTOR PROTECTOR

(71) Applicant: VeEX Inc., Fremont, CA (US)

(72) Inventors: Paul Chang, Fremont, CA (US);
Cyrille Morelle, Los Altos, CA (US);
Cheng-Pei Tung, Taipei (TW)

(73) Assignee: VeEX Inc., Fremont, CA (US)

( * ) Notice: Subject to any disclaimer, the term of this patent is extended or adjusted under 35 U.S.C. 154(b) by 0 days.

(21) Appl. No.: 18/970,529

(22) Filed: Dec. 5, 2024

(51) Int. Cl.
*H04B 10/00* (2013.01)
*G01M 11/00* (2006.01)
*G02B 6/42* (2006.01)

(52) U.S. Cl.
CPC ....... *G02B 6/4298* (2013.01); *G01M 11/3154* (2013.01)

(58) Field of Classification Search
CPC .......... G02B 6/4298; G01M 11/3154
See application file for complete search history.

(56) References Cited

U.S. PATENT DOCUMENTS

| 4,737,009 A * | 4/1988 | Kakii | G02B 6/3885 |
| | | | 385/59 |
| 6,612,750 B1 * | 9/2003 | Bull | G02B 6/3825 |
| | | | 385/83 |
| 2004/0258365 A1 | 12/2004 | Chudoba | |
| 2019/0137697 A1 * | 5/2019 | Jensen | G02B 6/3849 |
| 2021/0247583 A1 | 8/2021 | Elkins, II | |

OTHER PUBLICATIONS

International Search Report and Written Opinion dated Jan. 28, 2025 in International Application No. PCT/US2024/059010, 9 pages.

* cited by examiner

*Primary Examiner* — Agustin Bello
(74) *Attorney, Agent, or Firm* — Rimon Law, P.C.

(57) ABSTRACT

An apparatus relating to a coupler comprising: a body comprising: a first end couplable to an external connector comprising an external ferrule, a second end couplable to an internal connector, comprising an internal ferrule, of a test device, and a cavity; and a first replaceable portion comprising a replaceable ferrule, the first replaceable portion positioned in the cavity and manually replaceable with a second replaceable portion.

20 Claims, 19 Drawing Sheets

500

Handle a test device comprising a coupler, attached to a panel of the test device, comprising: a) a body comprising: i) a first end couplable to an external connector comprising an external ferrule, ii) a second end couplable to an internal connector, comprising an internal ferrule, of the test device, and iii) a chamber; and b) a first replaceable portion comprising a replaceable ferrule, the first replaceable portion positioned in the chamber
502

Manually remove the first replaceable portion comprising the replaceable ferrule from the body
504

Manually insert a second replaceable portion having the same design as the first replaceable portion into the body so that a replaceable ferrule of the second replaceable portion is engaged with the internal ferrule of the test device, the test device operable to conduct a test of a fiber optic network after insertion of the second replaceable portion into the body
506

FIGURE 5

FIELD REPLACEABLE OPTICAL CONNECTOR PROTECTOR

FIELD OF THE INVENTION

The present technology relates to test equipment for fiber optic networks. More particularly, the present technology relates to protection for an optical connector.

BACKGROUND

Various types of communications networks are available to deliver a wide array of services. Communications networks can be supported by various technologies, including, for example, cable networks, Ethernet, Wi-Fi, DSL, mobile, and fiber optic networks. Communications networks warrant monitoring and testing to assess their operation and to allow troubleshooting when problems arise. In particular, a fiber optic network is a type of communications network that uses light pulses (e.g., lasers) to transmit data over long distances. A fiber optic network consists of a network of optical fibers, which are thin, flexible strands of glass or plastic that can carry light signals. Test equipment can be connected to a fiber optic network to determine conditions of the network.

SUMMARY

Various embodiments of the present technology can include apparatuses relating to a coupler comprising: a body comprising: a first end couplable to an external connector comprising an external ferrule, a second end couplable to an internal connector, comprising an internal ferrule, of a test device, and a cavity; and a first replaceable portion comprising a replaceable ferrule, the first replaceable portion positioned in the cavity and manually replaceable with a second replaceable portion.

In some embodiments, the coupler is attached to a panel of the test device.

In some embodiments, a first end of the replaceable ferrule is engageable with the external ferrule and a second end of the replaceable ferrule is engageable with the internal ferrule of the test device.

In some embodiments, the first replaceable portion further comprises a sleeve in which a first end of the removeable ferrule is contained, the sleeve comprising a space into which the internal ferrule of the test device is insertable.

In some embodiments, a second end of the removeable ferrule extends beyond an annular surface of the first end, the second end grippable by fingers of a person in control of the test device to remove the first replaceable portion from the cavity.

In some embodiments, the annular surface includes a circular recess.

In some embodiments, the cavity comprises a first cylindrical portion having a first diameter and a second cylindrical portion having a second diameter different from the first diameter, the first replaceable portion positioned in the first portion and the second portion.

In some embodiments, the body further comprises a first portion adjacent to the first end and a second portion adjacent to the second end, the first portion having an outer circumferential surface with a first diameter and the second portion having an outer circumferential surface with a second diameter different from the first diameter.

In some embodiments, the first end comprises a threaded section couplable with the external connector through an adapter and the second end comprises a threaded section couplable with the internal connector.

In some embodiments, the coupler further comprises the second replaceable portion after the first replaceable portion is replaced by the second replaceable portion in the cavity, the second replaceable portion having the same design as the first replaceable portion.

In some embodiments, the body further comprises a portion having an index, the removeable ferrule positioned in the cavity based on alignment of the index and an indentation formed on the removeable ferrule.

In some embodiments, the body further comprises a portion in which a pocket is formed and the replaceable portion further comprises a wing assembly positioned in the pocket.

In some embodiments, the wing assembly comprises wings that extend beyond a surface of the portion of the body, the wings grippable by fingers of a person in control of the test device to remove the first replaceable portion from the cavity.

In some embodiments, the wing assembly further comprises a bracket and arms holding the removeable ferrule.

Various embodiments of the present technology can include apparatuses relating to a test device comprising: a coupler, attached to a panel of the test device, comprising a body comprising: a first end couplable to an external connector comprising an external ferrule, a second end couplable to an internal connector, comprising an internal ferrule, of the test device, and a cavity; and a first replaceable portion comprising a replaceable ferrule, the first replaceable portion positioned in the cavity and manually replaceable with a second replaceable portion.

In some embodiments, the test device is an optical time domain reflectometer (OTDR) and the external connector is associated with a fiber optic network.

In some embodiments, a first end of the replaceable ferrule is engageable with the external ferrule and a second end of the replaceable ferrule is engageable with the internal ferrule of the test device.

Various embodiments of the present technology can include methods comprising: handling a test device comprising a coupler, attached to a panel of the test device, comprising: a) a body comprising: i) a first end couplable to an external connector comprising an external ferrule, ii) a second end couplable to an internal connector, comprising an internal ferrule, of the test device, and iii) a cavity; and b) a first replaceable portion comprising a replaceable ferrule, the first replaceable portion positioned in the cavity; and manually removing the first replaceable portion comprising the replaceable ferrule from the body.

In some embodiments, the methods further comprise manually inserting a second replaceable portion having the same design as the first replaceable portion into the body so that a replaceable ferrule of the second replaceable portion is engaged with the internal ferrule of the test device, the test device operable to conduct a test of a fiber optic network after insertion of the second replaceable portion into the body.

In some embodiments, the methods further comprise: manually removing the second replaceable portion from the body; and manually inserting a third replaceable portion having the same design as the first replaceable portion and the second replaceable portion into the body so that a replaceable ferrule of the third replaceable portion is engaged with the internal ferrule of the test device, the test device operable to conduct a second test of the fiber optic network after insertion of the third replaceable portion into the body.

It should be appreciated that many other features, applications, embodiments, and/or variations of the present technology will be apparent from the accompanying drawings and from the following detailed description. Additional and/or alternative implementations of the structures, systems, and methods described herein can be employed without departing from the principles of the present technology.

BRIEF DESCRIPTION OF THE DRAWINGS

FIG. 5 is an example method 500, according to various embodiments of the present technology.

Figure 1A:
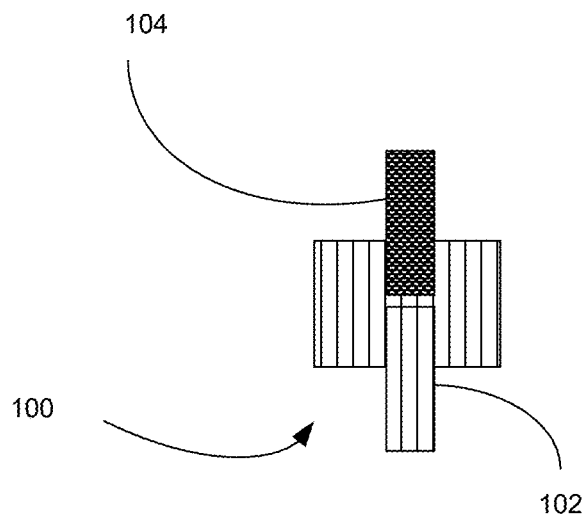
FIGS. 1A-1B are simplified diagrams of conventional devices.

The figures depict various embodiments of the present technology for purposes of illustration only, wherein the figures use like reference numerals to identify like elements. One skilled in the art will readily recognize from the following discussion that alternative embodiments of the structures and methods illustrated in the figures can be employed without departing from the principles of the present technology described herein.

DETAILED DESCRIPTION

Communications networks warrant monitoring and testing to assess their operation and to allow troubleshooting when problems arise. In particular, a fiber optic network is a type of communications network that uses light pulses (e.g., lasers) to transmit data over long distances. A fiber optic network includes a network of optical fibers, which are thin, flexible strands of glass or plastic that can carry light signals. Test equipment can be connected to a fiber optic network to determine conditions of the network.

Various types of test equipment can be used for testing network health. For example, an optical time domain reflectometer (OTDR) is a specialized, mobile test device that can be critical for the installation, maintenance, and troubleshooting of fiber optic networks by providing detailed insights that help optimize network reliability and performance. The OTDR can transmit a series of light pulses (e.g., lasers) into an optical fiber and measure light signals reflected back to the OTDR. The OTDR can utilize the measured light signals to calculate various properties of the optical fiber. By analyzing the light signals reflected back to the OTDR, the OTDR can determine loss characteristics of an optical fiber. Through assessment of the time duration and the intensity of the reflected light, the OTDR can determine the location and severity of breaks, bends, or other impairments associated with the optical fiber. This information provided by the OTDR empowers field personnel to assess performance and integrity of optical fibers and a fiber optic network.

An OTDR can be a portable device with a form factor that enables a person to conveniently carry and handle the OTDR in the field to perform various services on a fiber optic network. The OTDR can include a laser transmitter to generate light pulses to be sent through an optical fiber. The OTDR can include an optical receiver to detect returning, or reflected, light pulses. The optical receiver can be sufficiently sensitive so as to be capable of distinguishing between backscattered light from an optical fiber versus light reflected from faults or connectors, which is essential for accurate analysis of the condition of an optical fiber. The OTDR also can include a processing unit to, for example, process light signals. The processing unit can interpret light pulses collected by the optical receiver. The processing unit can calculate the length of an optical fiber, identify and locate faults in the optical fiber, and assess optical loss of the optical fiber. The processing unit can operate according to instructions (e.g., firmware, software) reflecting algorithms to analyze the light pulses received by the optical receiver. The OTDR can include a variety of other components, such as an optical attenuator, a reference detector, a photodetector, a sampling oscilloscope, a display, an interface, etc.

The OTDR can be directly or indirectly connected to an optical fiber of a fiber optic network to be tested. FIG. 1A illustrates a simplified diagram of a conventional design of a conventional connector base (or port, coupler, etc.) 100 of an OTDR (not shown). The connector base 100 of the OTDR can provide access to an internal ferrule 102 located within the OTDR. The internal ferrule 102 can encase an optical fiber located within the OTDR. An end of the internal ferrule 102 can be exposed or accessible through an opening in the connector base 100 for coupling with an external optical fiber of a fiber optic network on which a test is to be conducted. The connector base 100 can connect with an adapter (not shown). The adapter in turn can engage with different types of fiber optic connectors (e.g., SC, LC, FC, ST) to couple an external optical fiber to the OTDR. When coupled to the connector base 100 through the adapter, a fiber optic connector (not shown) of an external optical fiber can contain a ferrule 104 that can engage (or mate) with the internal ferrule 102. Through routine use of the OTDR and repeated engagement (or mating) of fiber optic connectors of external optical fiber with the connector base 100 of the OTDR, the internal ferrule 102 can become scratched or otherwise damaged, impairing the transmission of light signals to and from the OTDR. When the internal ferrule 102 is damaged, proper operation of the OTDR can become compromised. The OTDR often must be shipped or otherwise returned to its manufacturer or other service facility for repair. Repair of the OTDR can involve removal of the original internal ferrule 102 from an optical fiber located within the OTDR and the connector base 100, and installation of a new internal ferrule. Repair of the OTDR in this manner is very inconvenient and expensive, requiring extensive labor and time.

Figure 1B:
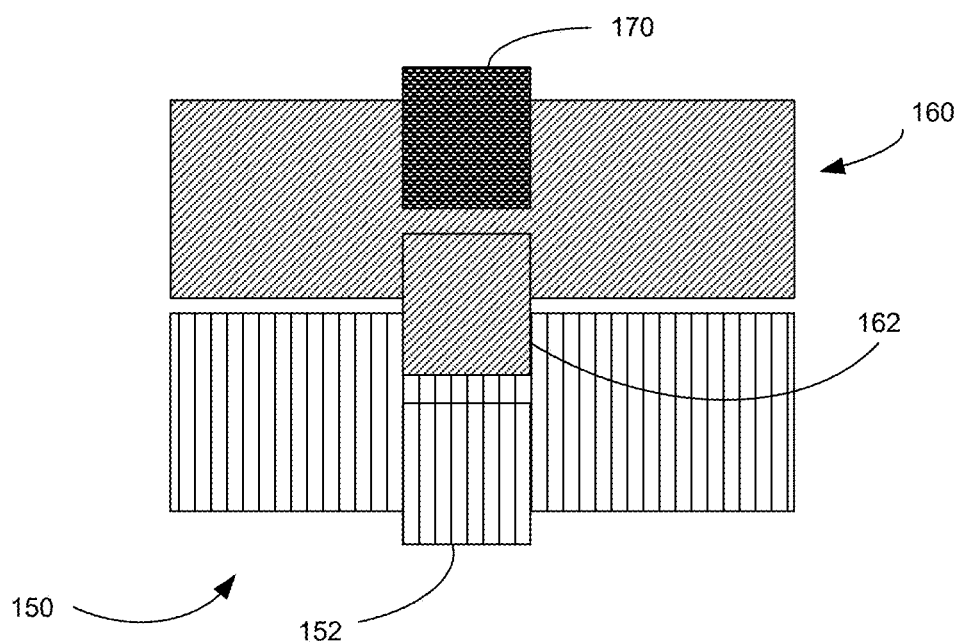

Other conventional techniques have been introduced in response to such significant disadvantages. FIG. 1B illustrates a simplified view of a conventional design of a conventional connector base 150 of an OTDR (not shown). The connector base 150 of the OTDR can provide access to an internal ferrule 152 located within the OTDR. The internal ferrule 152 can encase an optical fiber located within the OTDR. A first end of the internal ferrule 152 can be exposed through an opening in the connector base 150 for direct or indirect coupling with an external optical fiber of a fiber optic network on which a test is to be conducted. A device 160 can be connected to the connector base 150. The device 160 can include a ferrule 162. When the device 160 is connected to the connector base 150, the first end of the internal ferrule 152 can be engaged with a first end of the ferrule 162. On its other end, the device 160 can engage with an adapter (not shown). The adapter in turn can connect with different types of fiber optic connectors (e.g., SC, LC, FC, ST) to couple an external optical fiber to the OTDR. When connected to the device 160 through the adapter, a fiber optic connector (not shown) of an external optical fiber can contain an external ferrule 170 that can engage (or mate) with a second end of the ferrule 162. Through routine use of the OTDR and repeated engagement (or mating) of fiber optic connectors with the device 160, the ferrule 162 can become scratched or otherwise damaged, impairing the transmission of light signals to and from the OTDR. When the ferrule 162 is damaged, the device 160 including the ferrule 162 can be discarded and replaced with a new device of the same design.

For example, a conventional device (or "port saver") designed to be placed over a conventional connector base of an OTDR has been introduced. The conventional device can include a body and a ferrule located substantially within the body. A first end of the conventional device can connect to the connector base of the OTDR. A first end of the ferrule inside the conventional device can engage with an internal ferrule of the OTDR exposed through the connector base of the OTDR. A second end of the conventional device can engage with a variety of adapters that, in turn, can engage with different types of fiber optic connectors (e.g., SC, LC, FC, ST). A second end of the ferrule within the conventional device can engage with a ferrule of a fiber optic connector connected to the adapter.

Through repeated use and handling, the second end of the ferrule of the conventional device can become scratched or otherwise damaged. In such circumstances, the conventional device—i.e., both the body and the ferrule inside—can be discarded and replaced with a different conventional device of the same design. The replacement of the damaged conventional device with the different conventional device in some instances can be less expensive than the costs associated with return of an OTDR to a repair facility to replace a damaged internal ferrule, as discussed above. However, given associated manufacturing difficulty and expense, the cost of the replacement of the conventional device can still be very significant. Further, a need to repeatedly replace conventional devices during the lifetime of an OTDR multiplies that significant cost.

Another example of a conventional technique involves a conventional device (or "protector") that can be inserted into an OTDR. The conventional device can include an elongated structure and one or more ferrules positioned substantially within the elongated structure. The OTDR can have a long internal slot that ends with a deeply recessed connector panel to receive the conventional device. The connector panel can have mounted thereon a conventional connector base that provides access to an internal ferrule within the OTDR. When the conventional device is fully inserted in the slot, a first end of the conventional device can engage with the internal ferrule of the OTDR and a second end of the conventional device can engage with an adapter. The adapter, in turn, can engage with fiber optic connectors of external optical fibers. A first end of the ferrule of the conventional device can engage with an end of the internal ferrule of the OTDR and a second end of the ferrule of the conventional device can engage with ferrules of the fiber optic connectors of external optical fibers. The second end of the ferrule of the conventional device can become scratched or otherwise damaged through use and handling of the OTDR. When scratches or damage occur on the second end of the ferrule, the entirety of the conventional device—i.e., both the elongated structure and the ferrule inside—can be removed from the OTDR and replaced by a different conventional device with the same design.

Such a conventional device is associated with various disadvantages. First, the conventional device by its form factor is relatively large and cumbersome. Second, the configuration of the conventional device can make it difficult for field personnel to easily insert the internal device into the slot to achieve the required engagement between the ferrule of the conventional device with the internal ferrule of the OTDR. Third, the replacement cost of a conventional device with a damaged ferrule for a different conventional device with a new ferrule is very expensive—i.e., often more expensive than the replacement cost of a damaged conventional device (or "port saver") in the example discussed above.

The present technology is an improved approach that overcomes the foregoing and other disadvantages associated with conventional approaches specifically arising in the realm of fiber optic network technology. The present technology provides various embodiments of a coupler for test equipment or a test device. The test device can include, but is not limited to, an OTDR to gauge the health, status, and condition of a communications network, such as a fiber optic network. The coupler can provide an interface between components within the test equipment and an adapter to engage with different types of fiber optic connectors of external optical fibers. The coupler can include a replaceable portion including a ferrule. A first end of the replaceable ferrule of the coupler can engage with an internal ferrule of the test device and a second end of the replaceable ferrule of the coupler can engage with a ferrule of a fiber optic connector of an external optical fiber. If the replaceable ferrule of the coupler becomes damaged, a person who is in the field to perform testing with the test device can easily and manually remove the damaged replaceable ferrule from the coupler and replace the damaged replaceable ferrule by inserting a new replaceable ferrule into the coupler. In various embodiments, the coupler can utilize different types of replaceable portions that include a replaceable ferrule.

Removal and replacement of a damaged replaceable ferrule in a coupler in accordance with the present technology provide myriad significant advantages. For example, the time, burden, and expense otherwise required to ship a damaged OTDR to a repair facility are avoided. The present technology allows a person in the field to simply and manually replace a damaged replaceable ferrule to immediately return a test device, such as an OTDR, to proper operation. As another example, the significant time and expense of discarding and replacing an entire "port saver" or "protector" device, such as those described in connection with FIGS. 1A and 1B, are avoided. The present technology is associated with only a minimal cost of ferrule replacement. Various inventive features and advantages of the present technology are discussed in more detail below.

Figure 2A:
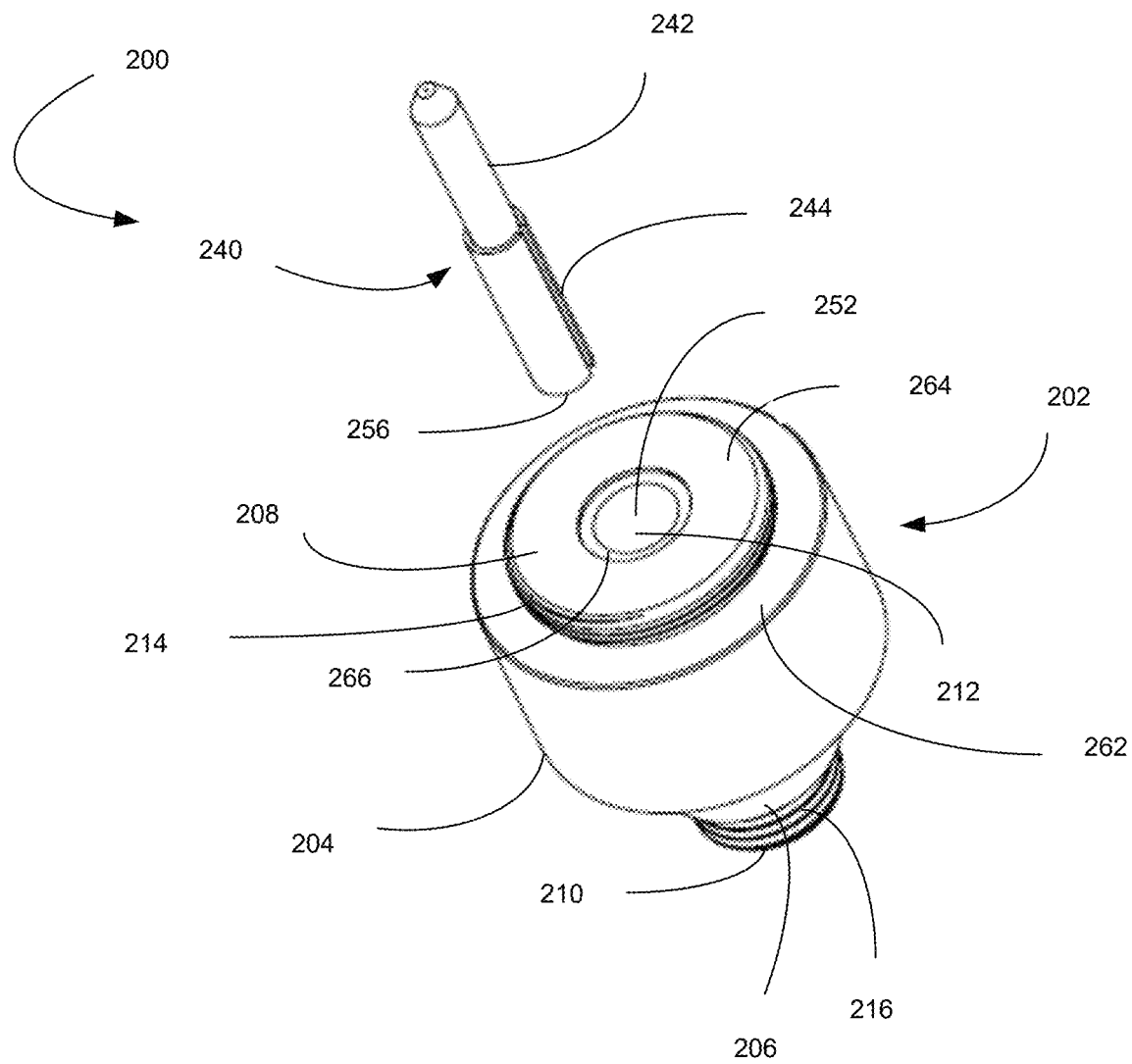
FIG. 2A is a perspective exploded view of a first coupler, according to various embodiments of the present technology.

FIG. 2A is a perspective exploded view of a coupler 200, according to various embodiments of the present technology. The coupler 200 can function as a port for a test device, such as an OTDR, to couple external optical fibers or associated external connectors with the test device. The coupling can be optical and mechanical. The coupler 200 can be affixed to a panel of the test device. As shown, the coupler 200 can include a body 202 and a replaceable portion 240. The body 202 can include a portion 204, a portion 206, an end 208, and an end 210. The body 202 can be metal. The portion 204 and the portion 206 can be annular. An outer diameter of the portion 204 can be larger than an outer diameter of the portion 206. The end 208 can be annular and extend in a longitudinal direction from the portion 204. The end 208 can include a threaded portion 214 that can engage with a complementary threaded portion of a device to be connected to the coupler 200, such as an adapter. The adapter can be any type of a variety of adapters, such as adapters configured to connect with SC, LC, FC, ST, or other types of fiber optic connectors external to the test device. In some embodiments, the end 208 can include other types of connections apart from threaded connections to connect a device to the coupler 200. The end 208 can include an annular surface 264 perpendicular to a longitudinal axis of the end 208. The annular surface 264 can include an inner edge forming a circular recess 266. An annular surface 262 of the body 202 can be adjacent to an outer circumferential surface of the portion 204 and an outer circumferential surface of the end 208.

The end 210 can be substantially cylindrical and extend longitudinally from the portion 206. The end 210 can include a threaded portion 216 that can engage with a complementary threaded portion of a fiber optic connector internal to the test device so that a ferrule of the internal fiber optic connector can engage with a ferrule 242 of the coupler 200. In some embodiments, the end 210 can include other types of connections apart from threaded connections to connect the internal fiber optic connector to the coupler 200. The coupler 200 can include an opening 252 to a cavity 212 formed in the coupler 200. The cavity 212 can include cylindrical portions, and extend centrally and longitudinally through the end 208, the portion 204, and the portion 206.

The coupler 200 can include the replaceable portion 240, which is shown removed from the body 202. The replaceable portion 240 can include the ferrule 242 that is positioned in a sleeve 244. The ferrule 242 can be, for example, ceramic, plastic, or stainless steel. The sleeve 244 can be, for example, plastic. The sleeve 244 can be substantially tubular and dimensioned to securely fit around the ferrule 242. The replaceable portion 240 can be inserted into the body 202 from an end 256 of the replaceable portion 240. When the test device is in use, the replaceable portion 240 can be securely positioned in the cavity 212 and in engagement with the fiber optic connector internal to the test device, allowing an external optical fiber to be connected to the test device.

Figure 2B:
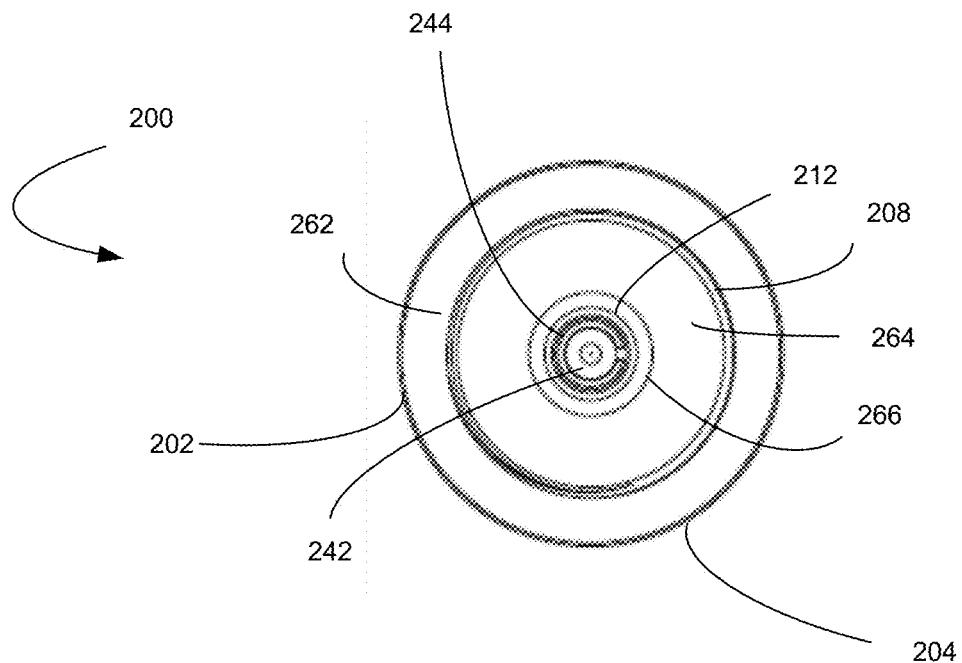
FIG. 2B is a top view of the first coupler, according to various embodiments of the present technology.

FIG. 2B illustrates a top view of the coupler 200, according to various embodiments of the present technology. As shown, the ferrule 242 and the sleeve 244 of the replaceable portion 240 can be positioned in the body 202. The replaceable portion 240 can be secured within the body 202 when the test device to which the coupler 200 is affixed is ready to be coupled with an external optical fiber. The end 208 can have an outer diameter that is smaller than the outer diameter of the portion 204. The annular surface 262 can be an area positioned between the outer circumferential surface of the portion 204 and the outer circumferential surface of the end 208. The circular recess 266 can be formed along the inner edge of the annular surface 264 of the end 208. When the replaceable portion 240 is inserted into the body 202, a substantial portion of the sleeve 244 and a substantial portion of the ferrule 242 can be positioned in the cavity 212.

Figure 2C:
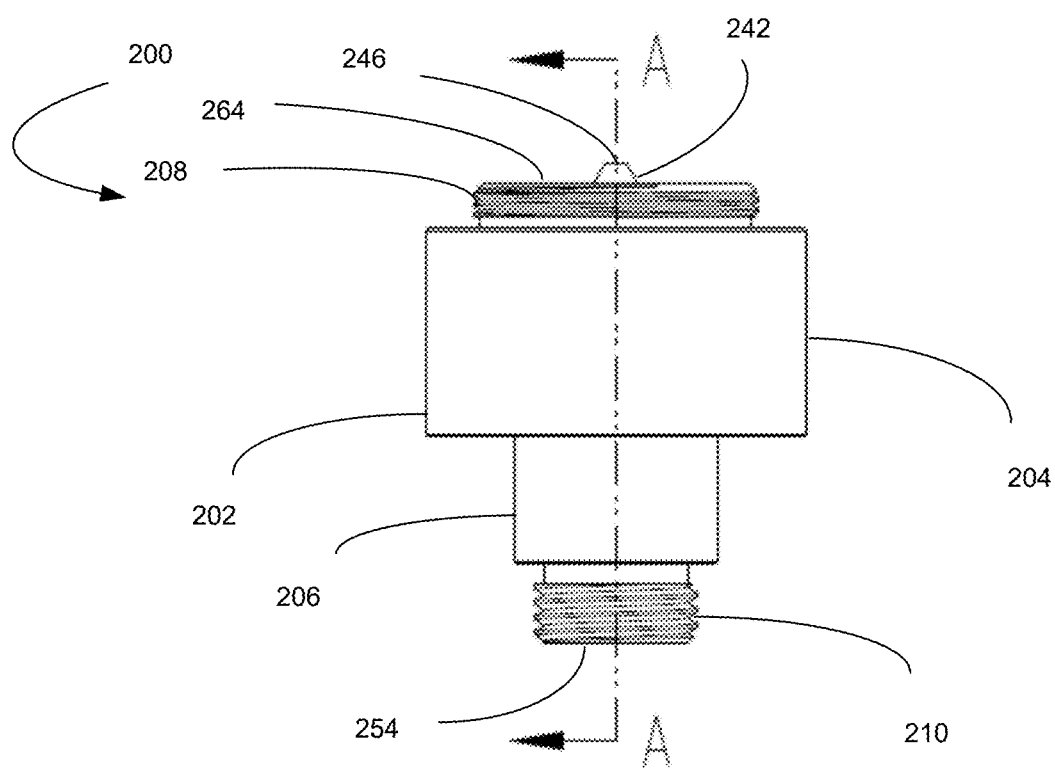
FIG. 2C is a side view of the first coupler, according to various embodiments of the present technology.

FIG. 2C is a side view of the coupler 200, according to various embodiments of the present technology. As shown, the ferrule 242 and the sleeve 244 of the replaceable portion 240 are positioned in the body 202. As mentioned, the replaceable portion 240 can be normally left in the body 202 or can be inserted into the body 202 when the test device to which the coupler 200 is affixed is ready to connect with an external fiber optic connector. The end 208 can engage with an adapter. As indicated, the adapter can be any type of a variety of adapters, such as adapters configured to connect with SC, LC, FC, ST, or other types of fiber optic connectors external to the test device. The adapter, in turn, can connect with a fiber optic connector of an external optical fiber. An end 246 of the ferrule 242 can extend through and beyond the annular surface 264 (and the opening 252) of the end 208. When the fiber optic connector of the external optical fiber is connected to the adapter, a ferrule of the fiber optic connector can engage with the end 246 of the ferrule 242. Thus, in routine use of the test device, the ferrule 242, instead of an internal ferrule of the test device, can engage with external fiber optic connectors. Accordingly, the coupler 200 can function as a protector of the internal ferrule of the test device through use of the replaceable portion 240 including the ferrule 242. Through repeated engagement between the ferrule 242 and external fiber optic connectors, the ferrule 242 in general or the end 246 of the ferrule 242 in particular can become scratched or otherwise damaged, causing the test device to function improperly or otherwise impair its ability to reliably conduct testing or accurately measure test results. When the ferrule 242 is determined to be damaged, the ferrule 242 can be removed and replaced. In this regard, a person can remove the replaceable portion 240 from the body 202 and insert a new replaceable portion 240 of the same design into the body 202 to allow resumption of proper functioning of the test device. After insertion of the new replaceable portion 240 into the body 202, the coupler 200 can be, through an adapter, coupled with an external fiber optic connector of an external optical fiber, allowing the test device to resume proper operation and testing. In this way, the internal ferrule of the test device can be spared from the damage caused by repeated engagement of external fiber optic connectors with the test device.

Removal of the replaceable portion 240 can be performed through a variety of simple actions manually performable by a person, such as a service technician who is handling the test device in the field. For example, the service technician can use fingers of either hand to grip the accessible portion of the ferrule 242 that extends beyond the annular surface 264 and the circular recess 266, and pull the ferrule 242 as part of the replaceable portion 240 out of the body 202. In this manner, removal of the replaceable portion 240 from the body 202 does not require a tool. As another example, the person can use any suitable tool, such as needle nose pliers, to grip the accessible portion of the ferrule 242 that extends beyond the annular surface 264 and the circular recess 266, and pull the ferrule 242 as part of the replaceable portion 240 out of the body 202. The circular recess 266 can provide more space to securely grip the ferrule 242. Insertion of a new or undamaged replaceable portion 240 also can be performed through a variety of simple actions performable by a person handling the test device. For example, the person can use fingers of either hand to grip a new replaceable portion 240 or the ferrule 242, and insert the end 256 of the new replaceable portion 240 into the opening 252 of the end 208 and push the new replaceable portion 240 into the body 202 until the new replaceable portion 240 is properly inserted and secured in the cavity 212. The new replaceable portion 240 can be properly and fully inserted in the cavity 212 when the ferrule 242 of the new replaceable portion 240 makes contact with the internal ferrule of the fiber optic connector internal to the test device. Such contact can stop the new replaceable portion 240 from an undesired amount of insertion into the cavity 212.

The new replaceable portion 240 can have the same (or similar) design, configuration, and function as the replaceable portion 240 that was removed. For example, the new replaceable portion 240 and the replaceable portion 240 that was removed can be created by the same manufacturing process. If the new replaceable portion 240 becomes damaged, that damaged replaceable portion 240 can be removed from the body 202 and replaced by another new replaceable portion 240 in the manner described. Each subsequent replaceable portion 240 that becomes damaged can be removed and replaced in the manner described. The ability to repeatedly remove damaged replaceable portions 240 and replace them with new replaceable portions 240 protects an internal ferrule of a test device from damage and provides significant advantages in cost, labor, and time over conventional techniques.

Figure 2D:
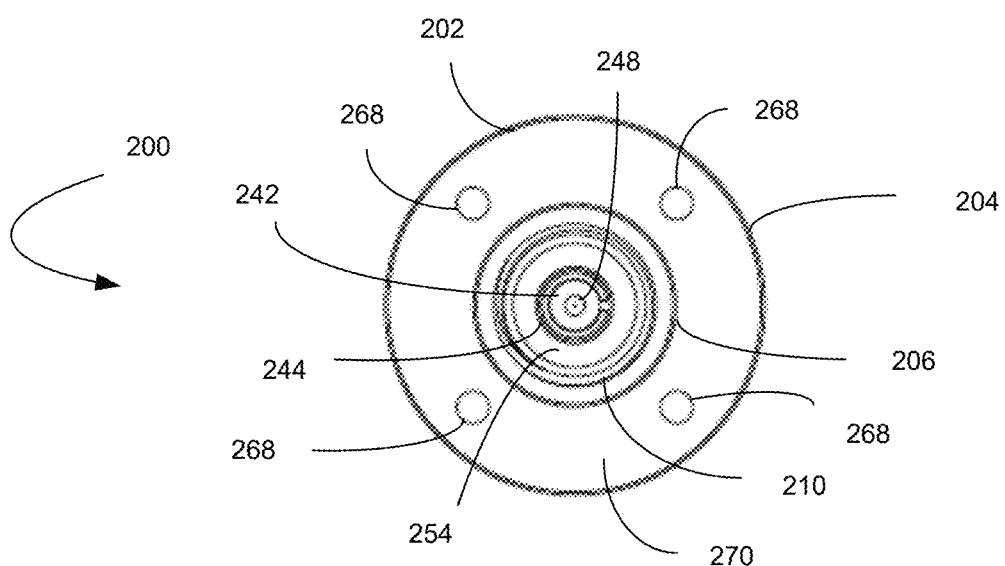
FIG. 2D is a bottom of the first coupler, according to various embodiments of the present technology.

FIG. 2D illustrates a bottom view of the coupler 200, according to various embodiments of the present technology. As shown, the ferrule 242 and the sleeve 244 of the replaceable portion 240 are positioned in the body 202. An outer diameter of the portion 206 can be larger than a diameter of the end 210. An end 248 of the ferrule 242 can be accessible through an opening 254 formed by the end 210. When the replaceable portion 240 is properly positioned in the body 202 for engagement with an adapter and operation of the test device, the end 248 of the ferrule 242 can make contact with the corresponding end of the internal ferrule of the fiber optic connector within the test device. An annular surface 270 of the portion 204 can be adjacent to the outer circumferential surface of the portion 204 and the outer circumferential surface of the portion 206. The annular surface 270 of the portion 204 can include holes 268. During manufacturing or assembly of the test device, the end 210 and the portion 206 can be inserted through an opening on a panel of the test device so that the annular surface 270 is overlaid on the outer surface of the panel. The body 202 can be attached to the panel of the test device by inserting screws through the holes 268 to affix the body 202 to the panel of the test device. Other mechanisms to fasten the body 202 or the coupler 200 to the test device can be used.

Figure 2E:
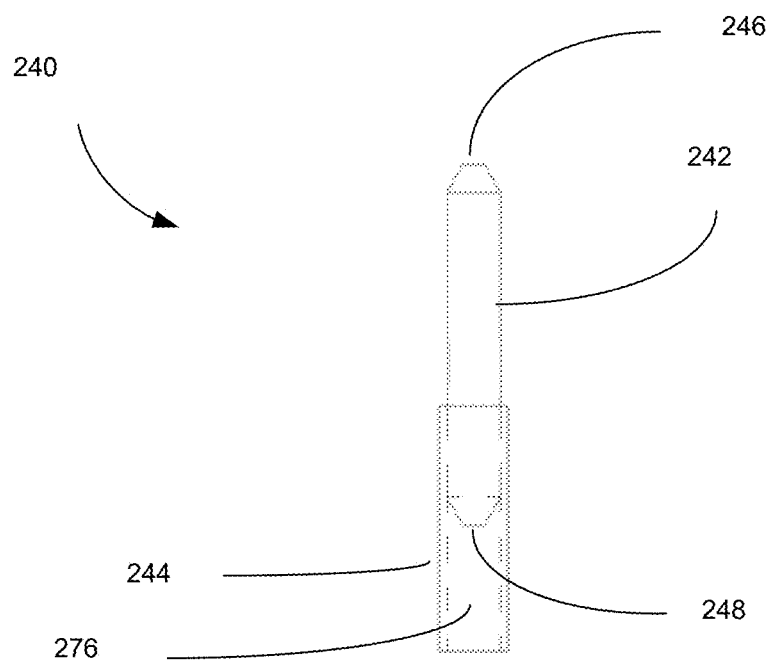
FIG. 2E is a side view of a replaceable portion of the first coupler, according to various embodiments of the present technology.

FIG. 2E illustrates a side view of the replaceable portion 240, according to various embodiments of the present technology. The ferrule 242 can be secured in the sleeve 244. The end 246 of the ferrule 242 can extend outside of the sleeve 244. Features inside of the sleeve 244 are shown with dotted lines. The end 248 of the ferrule 242 can be positioned within the sleeve 244. The sleeve 244 can include a space 276 into which an internal ferrule of an internal fiber optic connector of the test device can be inserted.

Figure 2F:
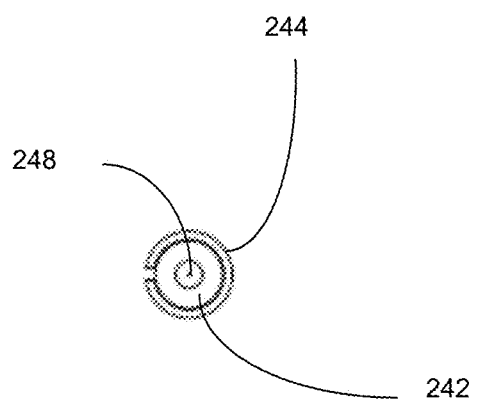
FIG. 2F is a bottom view of the replaceable portion of the first coupler, according to various embodiments of the present technology.

FIG. 2F illustrates a bottom view of the replaceable portion 240, according to various embodiments of the present technology. The end 248 of the ferrule 242 is accessible inside the sleeve 244.

Figure 2G:
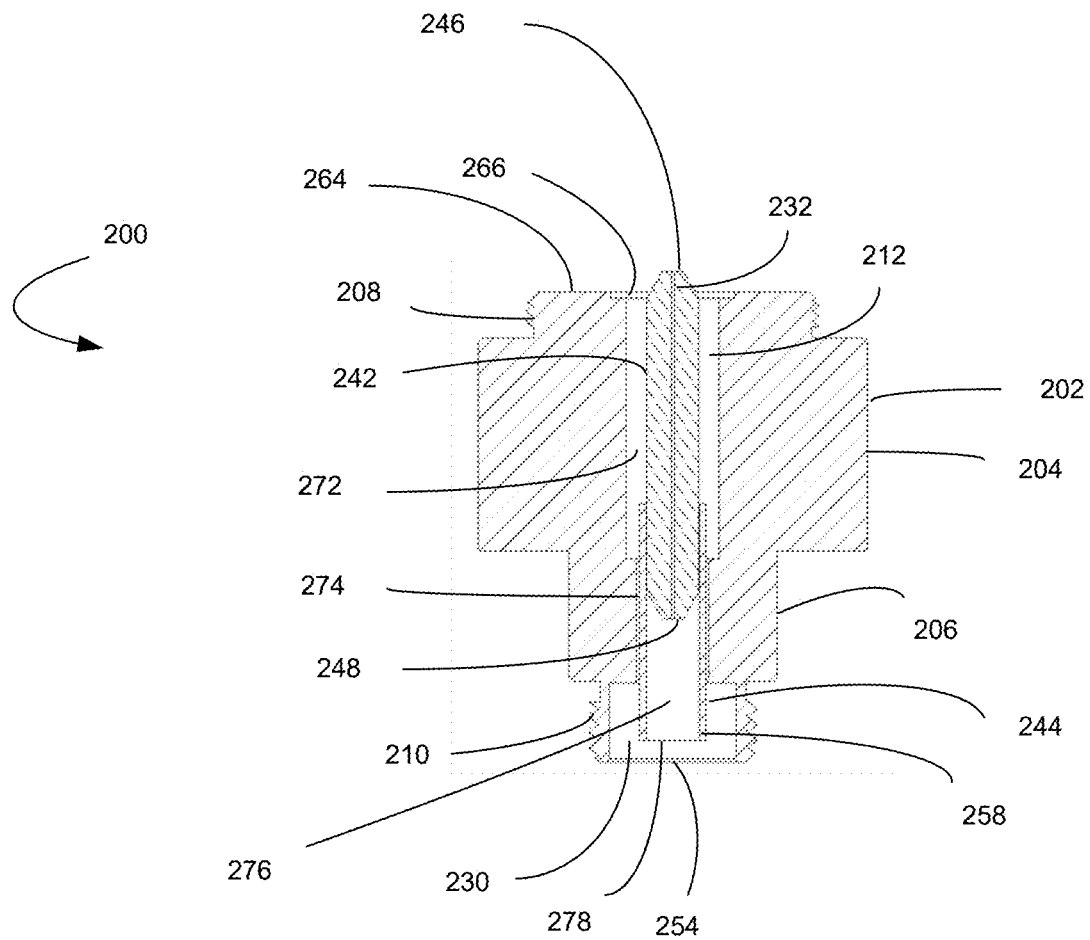
FIG. 2G is a sectional view taken along the line A-A of FIG. 2C, according to various embodiments of the present technology.

FIG. 2G illustrates a sectional view taken along the line A-A of FIG. 2C, according to various embodiments of the present technology. The end 246 of the ferrule 242 can be accessible beyond the annular surface 264 and the circular recess 266 of the end 208 to engage with a ferrule of an external fiber optic connector. The ferrule 242 can have a core 232. The ferrule 242 and the sleeve 244 of the replaceable portion 240 can be positioned within a portion 272 of the cavity 212 and a portion 274 of the cavity 212. The portion 272 and the portion 274 can be cylindrical. A diameter of the portion 272 can be larger than a diameter of the portion 274. A first portion of the replaceable portion 240 can be located within the portion 272 while a second portion of the replaceable portion 240 can be located within the portion 274. The end 258 of the sleeve 244 can be located within a space 230 formed by the end 210 and accessible through the opening 254. The end 258 of the sleeve 244 can have an opening 278 to the space 276 formed by the sleeve 244. The sleeve 244 can receive an internal ferrule of a fiber optic connector within the test device in the space 276 so that the internal ferrule can engage with the end 248 of the ferrule 242.

Figure 2H:
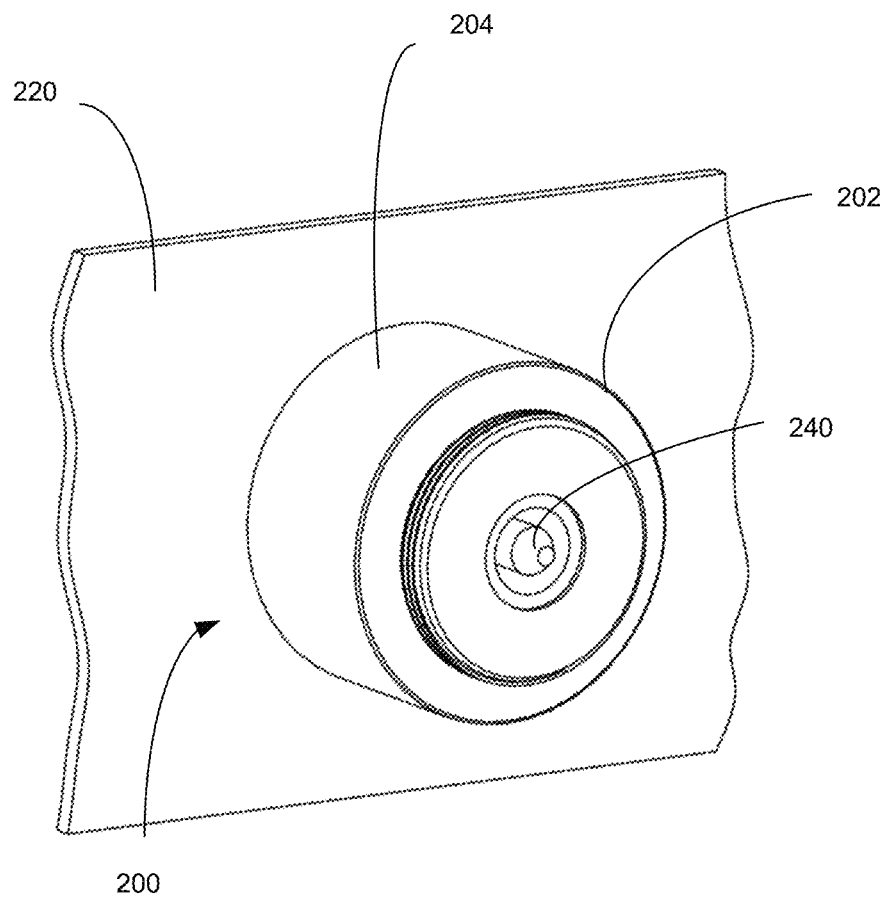
FIG. 2H is a perspective view of the first coupler as affixed to a panel of a test device, according to various embodiments of the present technology.

FIG. 2H is a perspective view of the coupler 200 as affixed to a panel 220 of a test device (e.g., OTDR), according to various embodiments of the present technology. The portion 204 of the body 202 of the coupler 200 can be mounted on or otherwise attached to an outer surface of the panel 220. The replaceable portion 240 can be positioned in the body 202. The replaceable portion 240 can be accessible to a person utilizing the test device. As discussed herein, the replaceable portion 240 can be easily and manually removed from the body 202, and replaced with another replaceable portion 240. Likewise, as discussed in more detail herein, a coupler 300 and a coupler 400 can be affixed to a panel of a test device. A replaceable portion 340 of the coupler 300 and a replaceable portion 440 of the coupler 400 likewise can be positioned in and easily and manually removed from, respectively, the body 302 and the body 402, and replaced with, respectively, another replaceable portion 340 and another replaceable portion 440.

Figure 3A:
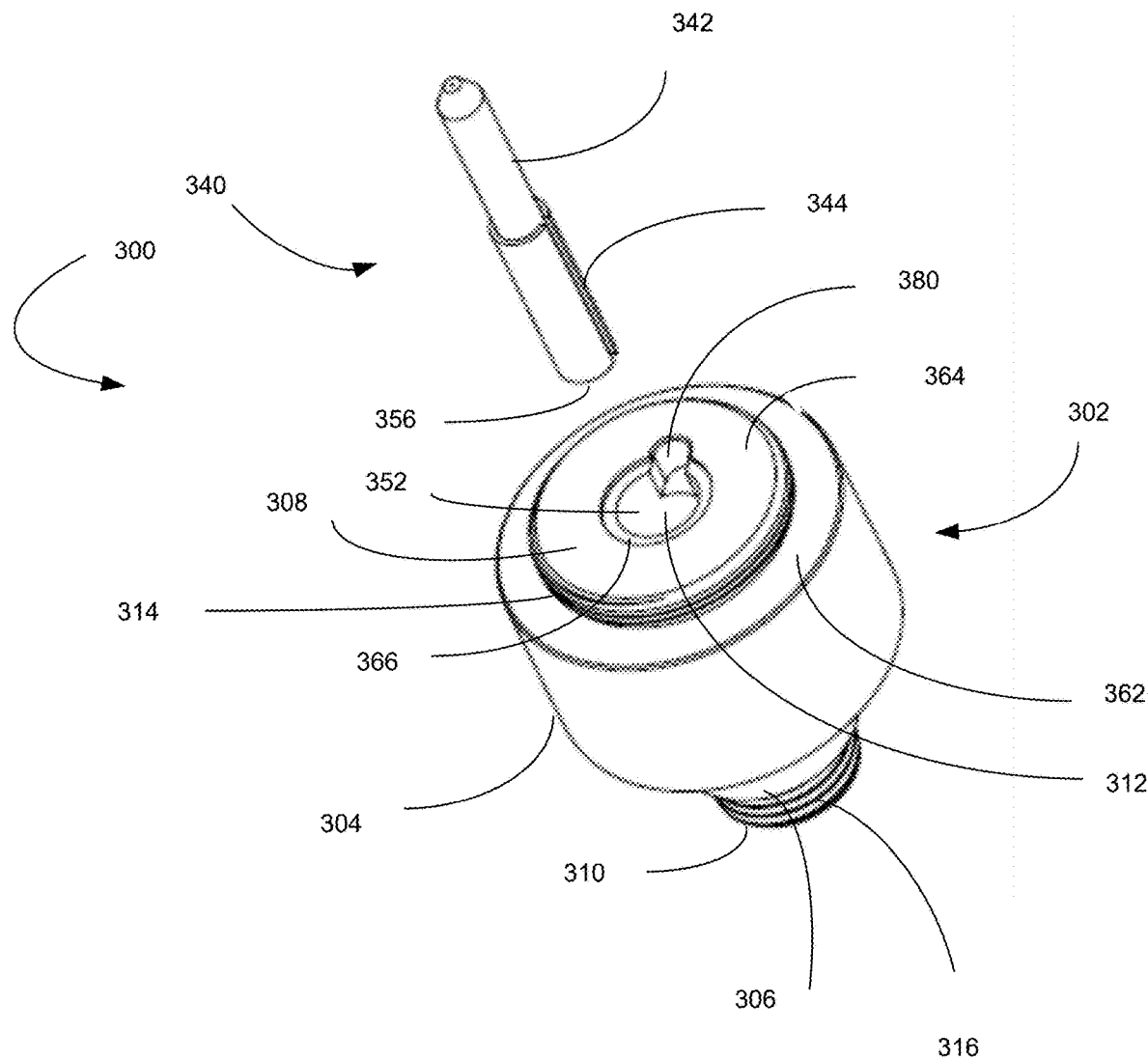
FIG. 3A is a perspective exploded view of a second coupler, according to various embodiments of the present technology.

FIG. 3A is a perspective exploded view of a coupler 300, according to various embodiments of the present technology. The coupler 300 can function as a port for a test device, such as an OTDR, to couple external optical fibers or associated external connectors with the test device. The coupling can be optical and mechanical. The coupler 300 can be affixed to a panel of the test device. As shown, the coupler 300 can include a body 302 and a replaceable portion 340. The body 302 can include a portion 304, a portion 306, an end 308, and an end 310. The body 302 can be metal. The portion 304 and the portion 306 can be annular. An outer diameter of the portion 304 can be larger than an outer diameter of the portion 306. The end 308 can be annular and extend in a longitudinal direction from the portion 304. The end 308 can include a threaded portion 314 that can engage with a complementary threaded portion of a device to be connected to the coupler 300, such as an adapter. The adapter can be any type of a variety of adapters, such as adapters configured to connect with SC, LC, FC, ST, or other types of fiber optic connectors external to the test device. In some embodiments, the end 308 can include other types of connections apart from threaded connections to connect a device to the coupler 300. The end 308 can include an annular surface 364 perpendicular to a longitudinal axis of the end 308. The annular surface 364 can include an inner edge forming a circular recess 366. An annular surface 362 of the body 302 can be adjacent to an outer circumferential surface of the portion 304 and an outer circumferential surface of the end 308.

An index (or recess) 380 can be formed on the inner circumferential surface and the annular surface 364 of the end 308. The index 380 can be used for alignment purposes for selected types of connectors (e.g., APC connectors). The index 380 can help to ensure that the ferrule 342 and the replaceable portion 340 are correctly oriented when inserted into the cavity 312 to maintain optimal signal transmission and minimize losses. The index 380 also can be used to align an adapter to be attached to the coupler 300.

The end 310 can be substantially cylindrical and extend longitudinally from the portion 306. The end 310 can include a threaded portion 316 that can engage with a complementary threaded portion of a fiber optic connector internal to the test device so that a ferrule of the internal fiber optic connector can engage with a ferrule 342 of the coupler 300. In some embodiments, the end 310 can include other types of connections apart from threaded connections to connect the internal fiber optic connector to the coupler 300. The coupler 300 can include an opening 352 to a cavity 312 formed in the coupler 300. The cavity 312 can include cylindrical portions, and extend centrally and longitudinally through the end 308, the portion 304, and the portion 306.

The coupler 300 can include the replaceable portion 340, which is shown removed from the body 302. The replaceable portion 340 can include the ferrule 342 that is positioned in a sleeve 344. The ferrule 342 can be, for example, ceramic, plastic, or stainless steel. The sleeve 344 can be, for example, plastic. The sleeve 344 can be substantially tubular and dimensioned to securely fit around the ferrule 342. The replaceable portion 340 can be inserted into the body 302 from an end 356 of the replaceable portion 340. When the test device is in use, the replaceable portion 340 can be securely positioned in the cavity 312 and in engagement with the fiber optic connector internal to the test device, allowing an external optical fiber to be connected to the test device.

Figure 3B:
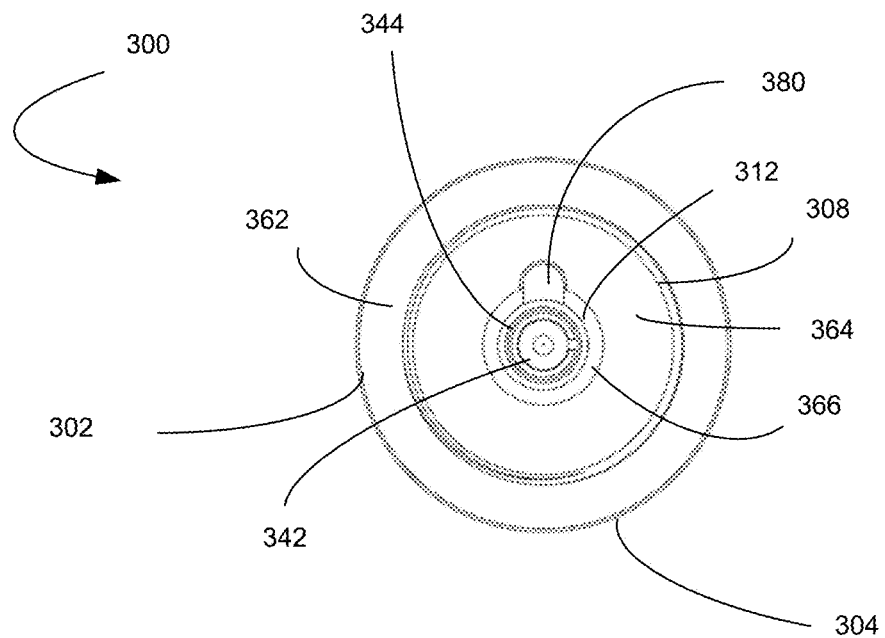
FIG. 3B is a top view of the second coupler, according to various embodiments of the present technology.

FIG. 3B illustrates a top view of the coupler 300, according to various embodiments of the present technology. As shown, the ferrule 342 and the sleeve 344 of the replaceable portion 340 can be positioned in the body 302. The replaceable portion 340 can be secured within the body 302 when the test device to which the coupler 300 is affixed is ready to be coupled with an external optical fiber. The end 308 can have an outer diameter that is smaller than the outer diameter of the portion 304. The annular surface 362 can be an area positioned between the outer circumferential surface of the portion 304 and the outer circumferential surface of the end 308. The circular recess 366 can be formed along the inner edge of the annular surface 364 of the end 308. When the replaceable portion 340 is inserted into the body 302, a substantial portion of the sleeve 344 and a substantial portion of the ferrule 342 can be positioned in the cavity 312. The index 380 can be used to correctly align the replaceable portion 340 as the replaceable portion 340 is inserted into the body 302.

Figure 3C:
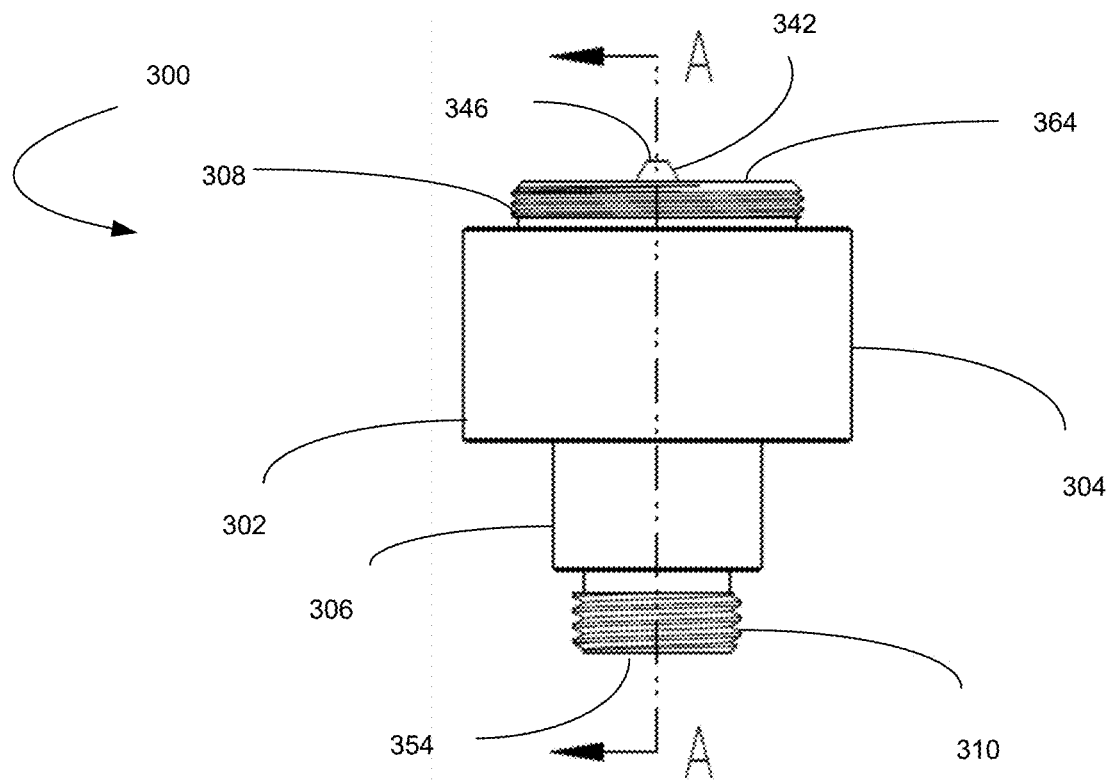
FIG. 3C is a side view of the second coupler, according to various embodiments of the present technology.

FIG. 3C is a side view of the coupler 300, according to various embodiments of the present technology. As shown, the ferrule 342 and the sleeve 344 of the replaceable portion 340 are positioned in the body 302. As mentioned, the replaceable portion 340 can be normally left in the body 302 or can be inserted into the body 302 when the test device to which the coupler 300 is affixed is ready to connect with an external fiber optic connector. The end 308 can engage with an adapter. As indicated, the adapter can be any type of a variety of adapters, such as adapters configured to connect with SC, LC, FC, ST, or other types of fiber optic connectors external to the test device. The adapter, in turn, can connect with a fiber optic connector of an external optical fiber. An end 346 of the ferrule 342 can extend through and beyond the annular surface 364 (and the opening 352) of the end 308. When the fiber optic connector of the external optical fiber is connected to the adapter, a ferrule of the fiber optic connector can engage with the end 346 of the ferrule 342. Thus, in routine use of the test device, the ferrule 342, instead of an internal ferrule of the test device, can engage with external fiber optic connectors. Accordingly, the coupler 300 can function as a protector of the internal ferrule of the test device through use of the replaceable portion 340 including the ferrule 342. Through repeated engagement between the ferrule 342 and external fiber optic connectors, the ferrule 342 in general or the end 346 of the ferrule 342 in particular can become scratched or otherwise damaged, causing the test device to function improperly or otherwise impair its ability to reliably conduct testing or accurately measure test results. When the ferrule 342 is determined to be damaged, the ferrule 342 can be removed and replaced. In this regard, a person can remove the replaceable portion 340 from the body 302 and insert a new replaceable portion 340 of the same design into the body 302 to allow resumption of proper functioning of the test device. After insertion of the new replaceable portion 340 into the body 302, the coupler 300 can be, through an adapter, coupled with an external fiber optic connector of an external optical fiber, allowing the test device to resume proper operation and testing. In this way, the internal ferrule of the test device can be spared from the damage caused by repeated engagement of external fiber optic connectors with the test device.

Removal of the replaceable portion 340 can be performed through a variety of simple actions manually performable by a person, such as a service technician who is handling the test device in the field. For example, the service technician can use fingers of either hand to grip the accessible portion of the ferrule 342 that extends beyond the annular surface 364 and the circular recess 366, and pull the ferrule 342 as part of the replaceable portion 340 out of the body 302. In this manner, removal of the replaceable portion 340 from the body 302 does not require a tool. As another example, the person can use any suitable tool, such as needle nose pliers, to grip the accessible portion of the ferrule 342 that extends beyond the annular surface 364 and the circular recess 366, and pull the ferrule 342 as part of the replaceable portion 340 out of the body 302. The circular recess 366 can provide more space to securely grip the ferrule 342. Insertion of a new or undamaged replaceable portion 340 also can be performed through a variety of simple actions performable by a person handling the test device. For example, the person can use fingers of either hand to grip a new replaceable portion 340 or the ferrule 342, and insert the end 356 of the new replaceable portion 340 into the opening 352 of the end 308 and push the new replaceable portion 340 into the body 302 until the new replaceable portion 340 is properly inserted and secured in the cavity 312. The new replaceable portion 340 can be properly and fully inserted in the cavity 312 when the ferrule 342 of the new replaceable portion 340 makes contact with the internal ferrule of the fiber optic connector internal to the test device. Such contact can stop the new replaceable portion 340 from an undesired amount of insertion into the cavity 312.

The new replaceable portion 340 can have the same (or similar) design, configuration, and function as the replaceable portion 340 that was removed. For example, the new replaceable portion 340 and the replaceable portion 340 that was removed can be created by the same manufacturing process. If the new replaceable portion 340 becomes damaged, that damaged replaceable portion 340 can be removed from the body 302 and replaced by another new replaceable portion 340 in the manner described. Each subsequent replaceable portion 340 that becomes damaged can be removed and replaced in the manner described. The ability to repeatedly remove damaged replaceable portions 340 and replace them with new replaceable portions 340 protects an internal ferrule of a test device from damage and provides significant advantages in cost, labor, and time over conventional techniques.

Figure 3D:
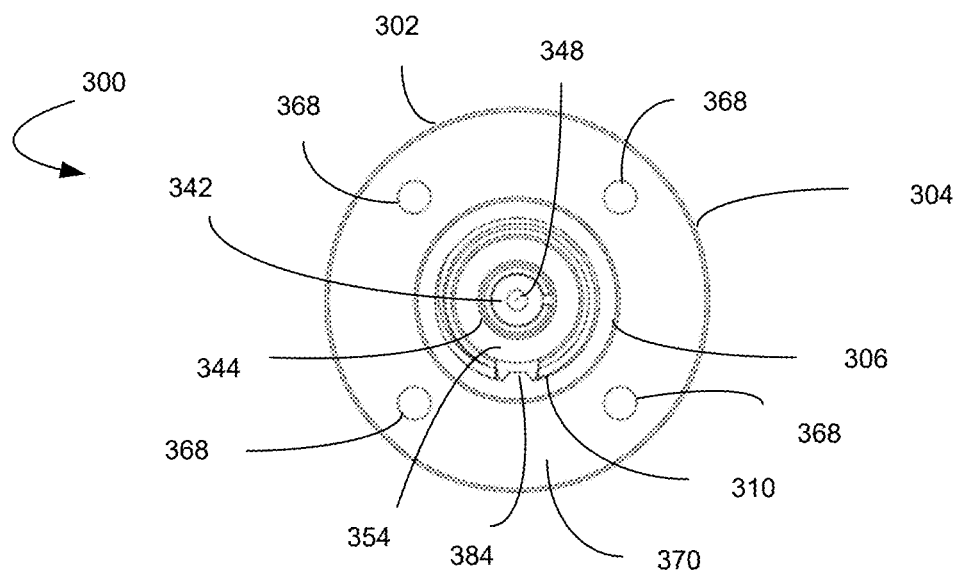
FIG. 3D is a bottom of the second coupler, according to various embodiments of the present technology.

FIG. 3D illustrates a bottom view of the coupler 300, according to various embodiments of the present technology. As shown, the ferrule 342 and the sleeve 344 of the replaceable portion 340 are positioned in the body 302. An outer diameter of the portion 306 can be larger than a diameter of the end 310. An end 348 of the ferrule 342 can be accessible through an opening 354 formed by the end 310. When the replaceable portion 340 is properly positioned in the body 302 for engagement with an adapter and operation of the test device, the end 348 of the ferrule 342 can make contact with the corresponding end of the internal ferrule of the fiber optic connector within the test device. An annular surface 370 of the portion 304 can be adjacent to the outer circumferential surface of the portion 304 and the outer circumferential surface of the portion 306. The annular surface 370 of the portion 304 can include holes 368. During manufacturing or assembly of the test device, the end 310 and the portion 306 can be inserted through an opening on a panel of the test device so that the annular surface 370 is overlaid on the outer surface of the panel. The body 302 can be attached to the panel of the test device by inserting screws through the holes 368 to affix the body 302 to the panel of the test device. Other mechanisms to fasten the body 302 or the coupler 300 to the test device can be used. An index 384 can be formed on the body 302 to allow alignment with an internal ferrule of a fiber optic connector (e.g., APC connector) internal to the test device.

Figure 3E:
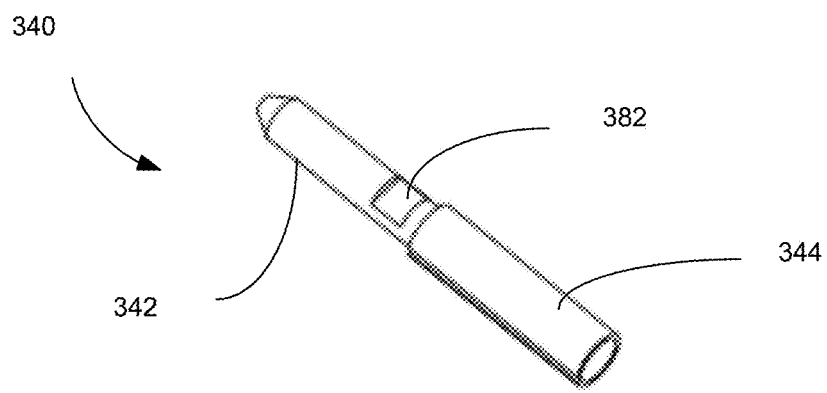
FIG. 3E is a perspective view of a replaceable portion of the second coupler, according to various embodiments of the present technology.

FIG. 3E illustrates a perspective view of the replaceable portion 340, according to various embodiments of the present technology. A notch 382 can be formed on an outer surface of the ferrule 342.

Figure 3F:
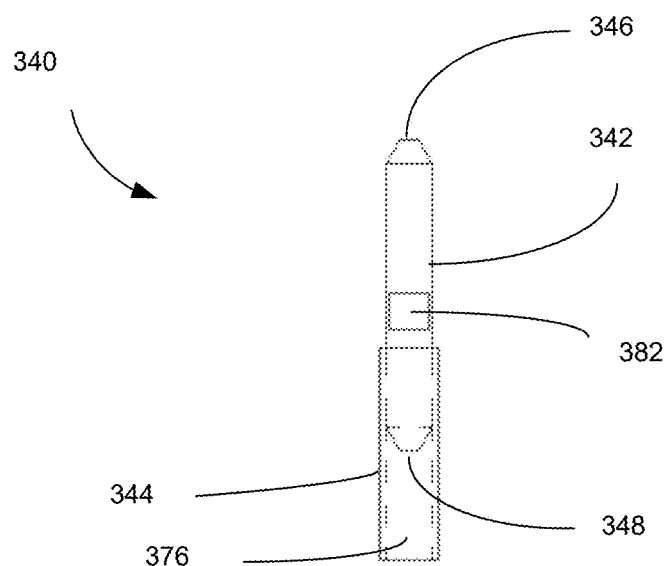
FIG. 3F is a side view of a replaceable portion of the second coupler, according to various embodiments of the present technology.

FIG. 3F illustrates a side view of the replaceable portion 340, according to various embodiments of the present technology. The ferrule 342 can be secured in the sleeve 344. The end 346 of the ferrule 342 can extend outside of the sleeve 344. Features inside of the sleeve 344 are shown with dotted lines. The end 348 of the ferrule 342 can be positioned within the sleeve 344. The sleeve 344 can include a space 376 into which an internal ferrule of an internal fiber optic connector of the test device can be inserted. The notch 382 can be aligned with the index 380 so that the ferrule 342 is correctly aligned when the replaceable portion 340 is inserted into the cavity 312. The notch 382 can be outside the sleeve 344 in the replaceable portion 340.

Figure 3G:
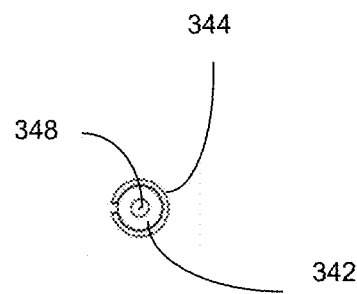
FIG. 3G is a bottom view of the replaceable portion of the second coupler, according to various embodiments of the present technology.

FIG. 3G illustrates a bottom view of the replaceable portion 340, according to various embodiments of the present technology. The end 348 of the ferrule 342 is accessible inside the sleeve 344.

Figure 3H:
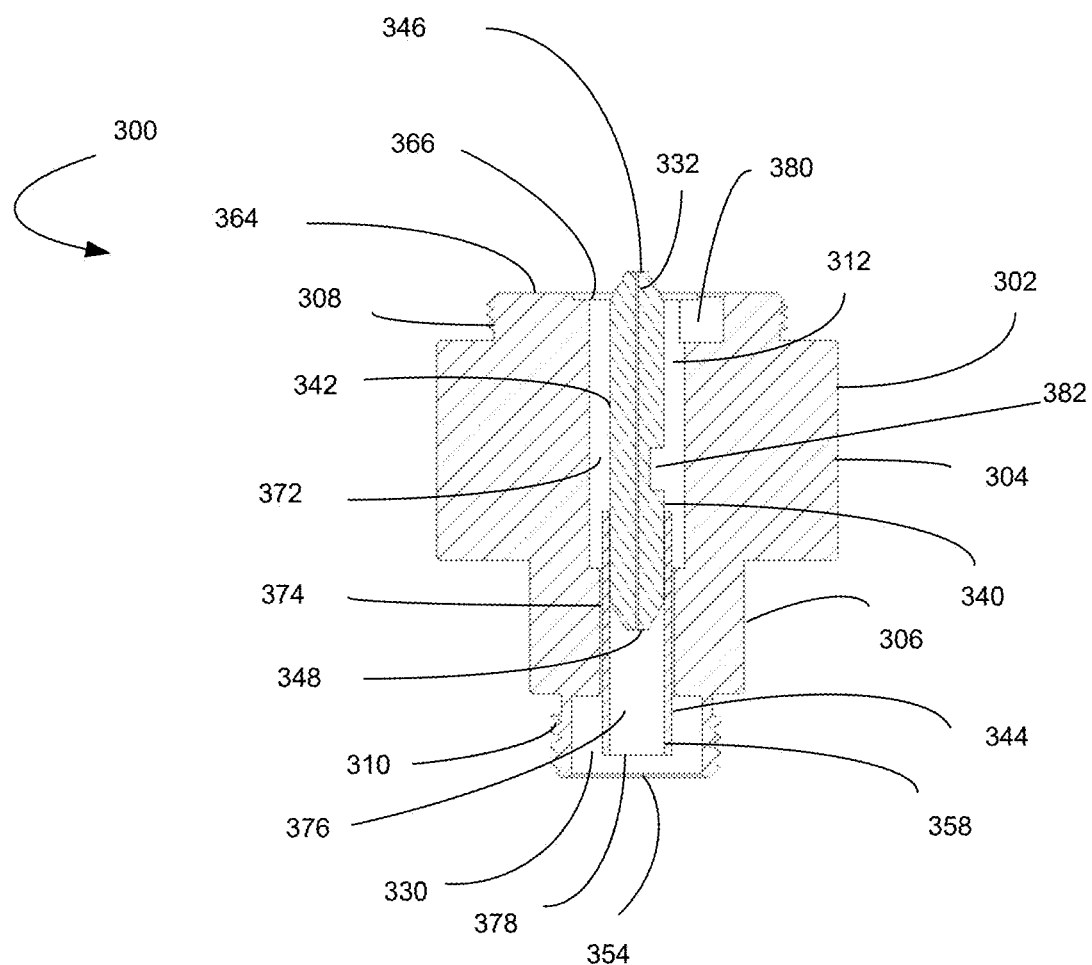
FIG. 3H is a sectional view taken along the line A-A of FIG. 3C, according to various embodiments of the present technology.

FIG. 3H illustrates a sectional view taken along the line A-A of FIG. 3C, according to various embodiments of the present technology. The end 346 of the ferrule 342 can be accessible beyond the annular surface 364 and the circular recess 366 of the end 308 to engage with a ferrule of an external fiber optic connector. The ferrule 342 can have a core 332. The ferrule 342 and the sleeve 344 of the replaceable portion 340 can be positioned within a portion 372 of the cavity 312 and a portion 374 of the cavity 312. The portion 372 and the portion 374 can be cylindrical. A diameter of the portion 372 can be larger than a diameter of the portion 374. A first portion of the replaceable portion 340 can be located within the portion 372 while a second portion of the replaceable portion 340 can be located within the portion 374. The end 358 of the sleeve 344 can be located within a space 330 formed by the end 310 and accessible through the opening 354. The end 358 of the sleeve 344 can have an opening 378 to the space 376 formed by the sleeve 344. The sleeve 344 can receive an internal ferrule of a fiber optic connector within the test device in the space 376 so that the internal ferrule can engage with the end 348 of the ferrule 342. The replaceable portion 340 can be positioned in the body 302 based on alignment between the index 380 and the notch 382 of the ferrule 342.

Figure 4A:
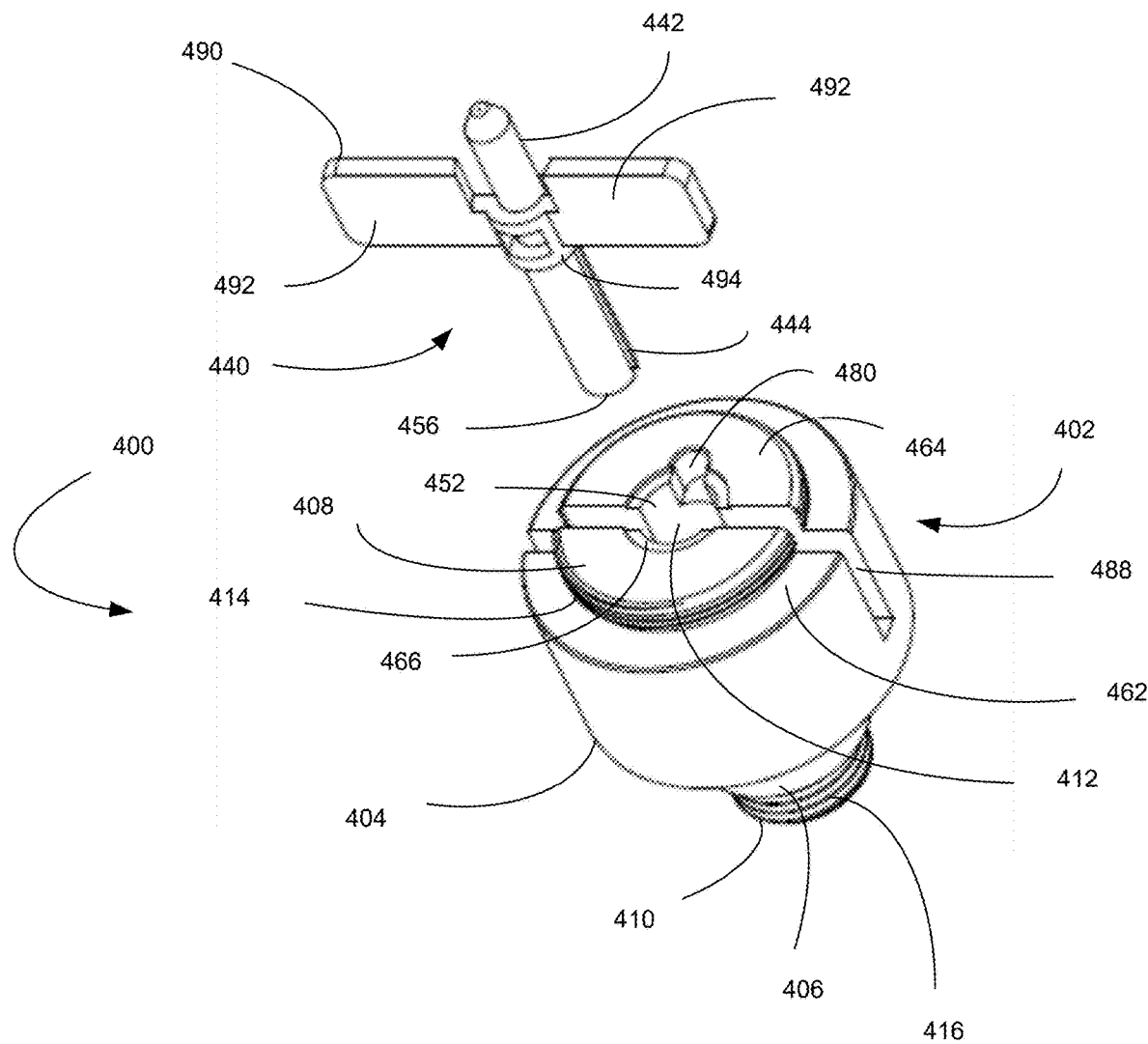
FIG. 4A is a perspective exploded view of a third coupler, according to various embodiments of the present technology.

FIG. 4A is a perspective exploded view of a coupler 400, according to various embodiments of the present technology. The coupler 400 can function as a port for a test device, such as an OTDR, to couple external optical fibers or associated external connectors with the test device. The coupling can be optical and mechanical. The coupler 400 can be affixed to a panel of the test device. As shown, the coupler 400 can include a body 402 and a replaceable portion 440. The body 402 can include a portion 404, a portion 406, an end 408, and an end 410. The body 402 can be metal. The portion 404 and the portion 406 can be annular. An outer diameter of the portion 404 can be larger than an outer diameter of the portion 406. The end 408 can be annular and extend in a longitudinal direction from the portion 404. The end 408 can include a threaded portion 414 that can engage with a complementary threaded portion of a device to be connected to the coupler 400, such as an adapter. The adapter can be any type of a variety of adapters, such as adapters configured to connect with SC, LC, FC, ST, or other types of fiber optic connectors external to the test device. In some embodiments, the end 408 can include other types of connections apart from threaded connections to connect a device to the coupler 400. The end 408 can include an annular surface 464 perpendicular to a longitudinal axis of the end 408. The annular surface 464 can include an inner edge forming a circular recess 466. An annular surface 462 of the body 402 can be adjacent to an outer circumferential surface of the portion 404 and an outer circumferential surface of the end 408.

An index (or recess) 480 can be formed on the inner circumferential surface and the annular surface 464 of the end 408. The index 480 can be used for alignment purposes. The index 480 can help to ensure that the ferrule 442 and the replaceable portion 440 are correctly oriented when inserted into the cavity 412 to maintain optimal signal transmission and minimize losses.

The end 410 can be substantially cylindrical and extend longitudinally from the portion 406. The end 410 can include a threaded portion 416 that can engage with a complementary threaded portion of a fiber optic connector internal to the test device so that a ferrule of the internal fiber optic connector can engage with a ferrule 442 of the coupler 400. In some embodiments, the end 410 can include other types of connections apart from threaded connections to connect the internal fiber optic connector to the coupler 400. The coupler 400 can include an opening 452 to a cavity 412 formed in the coupler 400. The cavity 412 can include cylindrical portions, and extend centrally and longitudinally through the end 408, the portion 404, and the portion 406.

The portion 404 can include a pocket (or slot) 488. The pocket 488 can extend longitudinally and centrally from the annular surface 464 of the end 408 into the portion 404 and terminate before the annular surface 470.

The coupler 400 can include the replaceable portion 440, which is shown removed from the body 402. The replaceable portion 440 can include the ferrule 442 that is positioned in a sleeve 444. The ferrule 442 can be, for example, ceramic, plastic, or stainless steel. The sleeve 444 can be, for example, plastic. The sleeve 444 can be substantially tubular and dimensioned to securely fit around the ferrule 442. The replaceable portion 440 can be inserted into the body 402 from an end 456 of the replaceable portion 440. When the test device is in use, the replaceable portion 440 can be securely positioned in the cavity 412 and in engagement with the fiber optic connector internal to the test device, allowing an external optical fiber to be connected to the test device.

The replaceable portion 440 also can include a wing assembly 490. The wing assembly 490 can be, for example, plastic. The wing assembly can include wings 492. The wings 492 can be symmetrically opposite one another with respect to the longitudinal axis of the ferrule 442. Each wing 492 can extend orthogonally away from the ferrule 442. The wing assembly 490 can include a bracket 494 disposed between the wings 492. The bracket 494 can be a U-shaped bracket in which the ferrule 442 can be positioned. The replaceable portion 440 can be inserted into the body 402 by aligning the wings 492 to slide into the pocket 488.

Figure 4B:
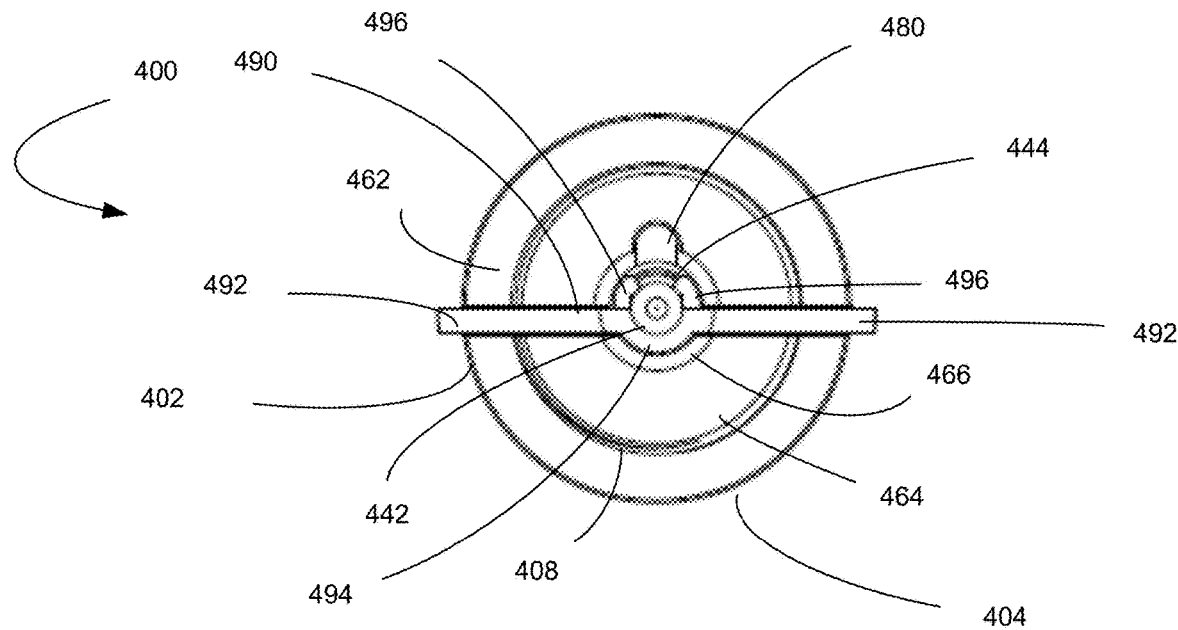
FIG. 4B is a top view of the third coupler, according to various embodiments of the present technology.

FIG. 4B illustrates a top view of the coupler 400, according to various embodiments of the present technology. As shown, the ferrule 442 and the sleeve 444 of the replaceable portion 440 can be positioned in the body 402. The replaceable portion 440 can be secured within the body 402 when the test device to which the coupler 400 is affixed is ready to be coupled with an external optical fiber. The end 408 can have an outer diameter that is smaller than the outer diameter of the portion 404. The annular surface 462 can be an area positioned between the outer circumferential surface of the portion 404 and the outer circumferential surface of the end 408. The circular recess 466 can be formed along the inner edge of the annular surface 464 of the end 408. When the replaceable portion 440 is inserted into the body 402, a substantial portion of the sleeve 444 and a substantial portion of the ferrule 442 can be positioned in the cavity 412. The index 480 can be used to correctly align the replaceable portion 440 as the replaceable portion 440 is inserted into the body 402.

The wing assembly 490 can include arms 496. The arms 496 can extend from the bracket 494 to secure the ferrule 442 to the wing assembly 490. The arms 496 can be curved, flexibly rigid, and spaced apart from one another. The ferrule 442 can be pushed through the space between the arms 496 and snapped into the arms 496 and the bracket 494. The arms 496 and the bracket 494 can securely hold the ferrule 442.

Figure 4C:
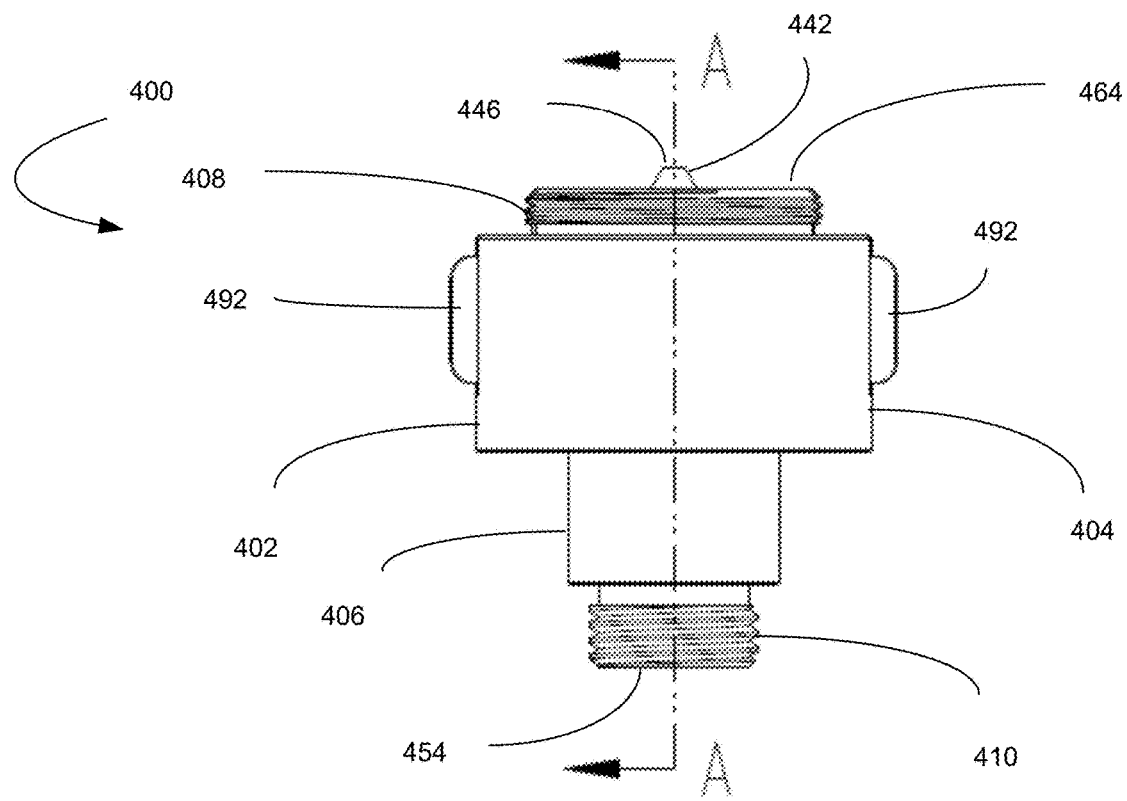
FIG. 4C is a first side view of the third coupler, according to various embodiments of the present technology.

FIG. 4C is a first side view of the coupler 400, according to various embodiments of the present technology. As shown, the ferrule 442 and the sleeve 444 of the replaceable portion 440 are positioned in the body 402. As mentioned, the replaceable portion 440 can be normally left in the body 402 or can be inserted into the body 402 when the test device to which the coupler 400 is affixed is ready to connect with an external fiber optic connector. The end 408 can engage with an adapter. As indicated, the adapter can be any type of a variety of adapters, such as adapters configured to connect with SC, LC, FC, ST, or other types of fiber optic connectors external to the test device. The adapter, in turn, can connect with a fiber optic connector of an external optical fiber. An end 446 of the ferrule 442 can extend through and beyond the annular surface 464 (and the opening 452) of the end 408. When the fiber optic connector of the external optical fiber is connected to the adapter, a ferrule of the fiber optic connector can engage with the end 446 of the ferrule 442. Thus, in routine use of the test device, the ferrule 442, instead of an internal ferrule of the test device, can engage with external fiber optic connectors. Accordingly, the coupler 400 can function as a protector of the internal ferrule of the test device through use of the replaceable portion 440 including the ferrule 442. Through repeated engagement between the ferrule 442 and external fiber optic connectors, the ferrule 442 in general or the end 446 of the ferrule 442 in particular can become scratched or otherwise damaged, causing the test device to function improperly or otherwise impair its ability to reliably conduct testing or accurately measure test results. When the ferrule 442 is determined to be damaged, the ferrule 442 can be removed and replaced. In this regard, a person can remove the replaceable portion 440 from the body 402 and insert a new replaceable portion 440 of the same design into the body 402 to allow resumption of proper functioning of the test device. After insertion of the new replaceable portion 440 into the body 402, the coupler 400 can be, through an adapter, coupled with an external fiber optic connector of an external optical fiber, allowing the test device to resume proper operation and testing. In this way, the internal ferrule of the test device can be spared from the damage caused by repeated engagement of external fiber optic connectors with the test device.

Removal of the replaceable portion 440 can be performed through a variety of simple actions manually performable by a person, such as a service technician who is handling the test device in the field. When the replaceable portion 440 is inserted in the body 402, the wings 492 can extend from the pocket 488 beyond the outer circumferential surface of the portion 404. When the ferrule 442 of the replaceable portion 440 is damaged or otherwise should be removed from the body 402, the wings 492 can be gripped to allow the replaceable portion 440 to be pulled out of the pocket 488 and the body 402. For example, the wings 492 can be manually gripped by fingers (e.g., thumb and index finger of a hand, thumb and middle finger of a hand, index finger of a hand and index finger of another hand, etc.) of a person handling the test device. In this way, the replaceable portion 440 can be easily removed without a tool if the ferrule 442 of the replaceable portion 440 requires inspection, becomes damaged, or otherwise needs replacement. As desired, a tool also can be used to remove the replaceable portion 440 through engagement with the wings 492.

Insertion of a new or undamaged replaceable portion 440 also can be performed through a variety of simple actions performable by a person handling the test device. For example, the person can use fingers of either hand to grip a new replaceable portion 440 or the wing 492, and insert the end 456 of the new replaceable portion 440 into the opening 452 of the end 408 and push the new replaceable portion 440 into the body 402 until the new replaceable portion 440 is properly inserted and secured in the cavity 412. The new replaceable portion 440 can be properly and fully inserted in the cavity 412 when the ferrule 442 of the new replaceable portion 440 makes contact with the internal ferrule of the fiber optic connector internal to the test device or the bottom edges of the wings 492 make contact with the end of the pocket 488. Such contact can stop the new replaceable portion 440 from an undesired amount of insertion into the cavity 412.

The new replaceable portion 440 can have the same (or similar) design, configuration, and function as the replaceable portion 440 that was removed. For example, the new replaceable portion 440 and the replaceable portion 440 that was removed can be created by the same manufacturing process. If the new replaceable portion 440 becomes damaged, that damaged replaceable portion 440 can be removed from the body 402 and replaced by another new replaceable portion 440 in the manner described. Each subsequent replaceable portion 440 that becomes damaged can be removed and replaced in the manner described. The ability to repeatedly remove damaged replaceable portions 440 and replace them with new replaceable portions 440 protects an internal ferrule of a test device from damage and provides significant advantages in cost, labor, and time over conventional techniques.

Figure 4D:
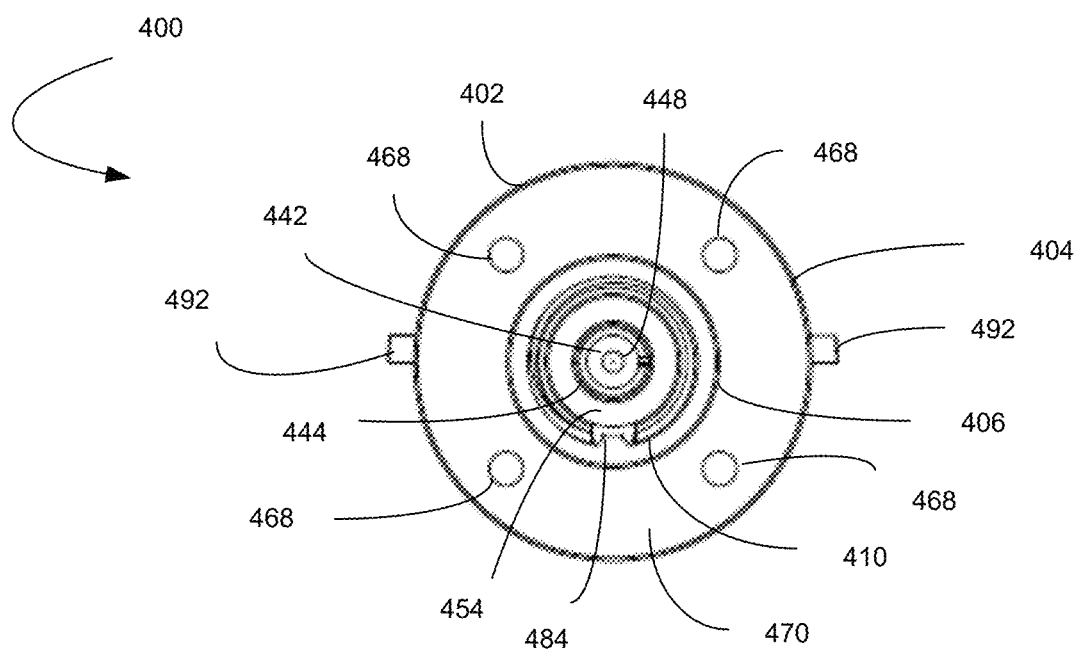
FIG. 4D is a bottom of the third coupler, according to various embodiments of the present technology.

FIG. 4D illustrates a bottom view of the coupler 400, according to various embodiments of the present technology. As shown, the ferrule 442 and the sleeve 444 of the replaceable portion 440 are positioned in the body 402. An outer diameter of the portion 406 can be larger than a diameter of the end 410. An end 448 of the ferrule 442 can be accessible through an opening 454 formed by the end 410. When the replaceable portion 440 is properly positioned in the body 402 for engagement with an adapter and operation of the test device, the end 448 of the ferrule 442 can make contact with the corresponding end of the internal ferrule of the fiber optic connector within the test device. An annular surface 470 of the portion 404 can be adjacent to the outer circumferential surface of the portion 404 and the outer circumferential surface of the portion 406. The annular surface 470 of the portion 404 can include holes 468. During manufacturing or assembly of the test device, the end 410 and the portion 406 can be inserted through an opening on a panel of the test device so that the annular surface 470 is overlaid on the outer surface of the panel. The body 402 can be attached to the panel of the test device by inserting screws through the holes 468 to affix the body 402 to the panel of the test device. Other mechanisms to fasten the body 402 or the coupler 400 to the test device can be used. An index 484 can be formed on the body 402 to allow alignment with an internal ferrule of a fiber optic connector internal to the test device. The wings 492 can extend beyond the outer circumferential surface of the portion 404.

Figure 4E:
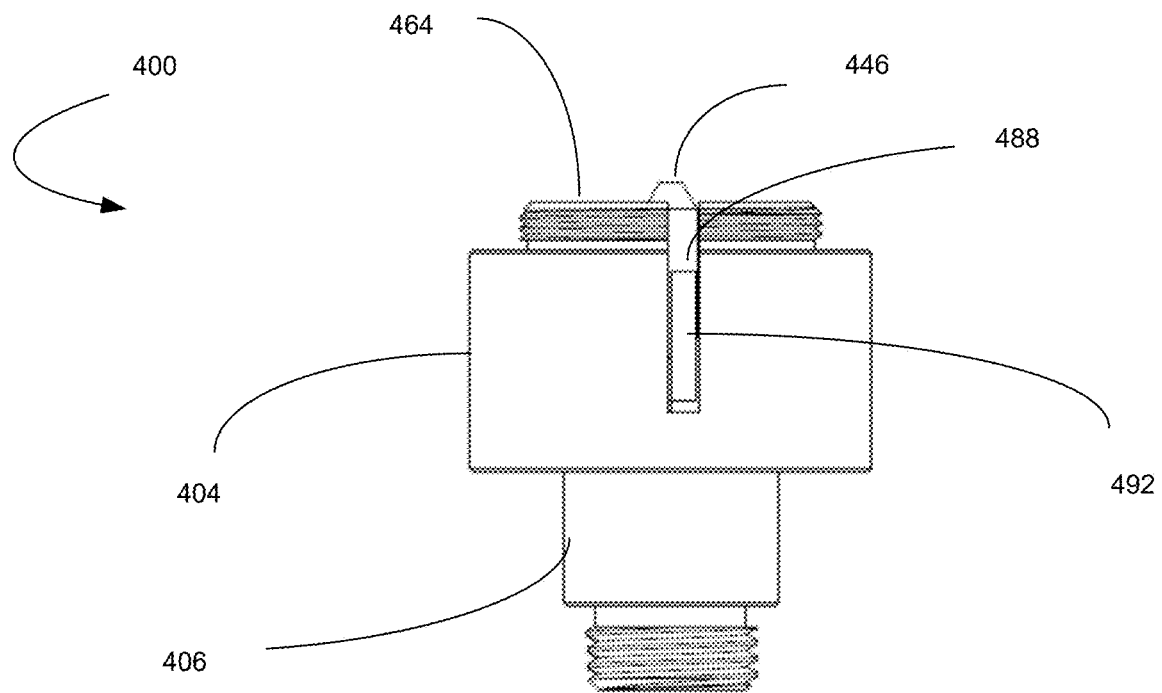
FIG. 4E is a second side view of the third coupler, according to various embodiments of the present technology.

FIG. 4E is a second side view of the coupler 400, according to various embodiments of the present technology. When the replaceable portion 440 is fully inserted into the coupler 400, the end 446 of the ferrule 442 can accessible outside the annular surface 464 of the end 408 and rotational movement of the wings 492 can be restricted by the pocket 488 of the portion 404.

Figure 4F:
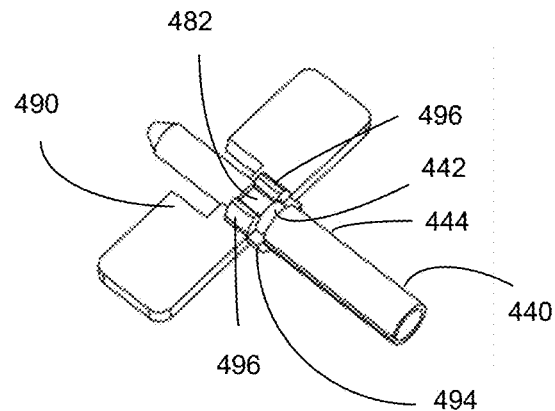
FIG. 4F is a perspective view of a replaceable portion of the third coupler, according to various embodiments of the present technology.

FIG. 4F illustrates a perspective view of the replaceable portion 440, according to various embodiments of the present technology. A notch 482 can be formed on an outer surface of the ferrule 442. The notch 482 can be aligned with the index 480 so that the ferrule 442 is correctly aligned when the replaceable portion 440 is inserted into the cavity 412. The notch 482 can be outside the sleeve 444 in the replaceable portion 440. The wing assembly 490 can be positioned along the ferrule 442 where the bracket 494 is positioned with the notch 482 and the bracket 494 abuts the sleeve 444. The arms 496 of the wing assembly 490 can extend from the bracket 494 and curve inwardly toward one another while a space between the arms 496 can be maintained over the notch 482.

Figure 4G:
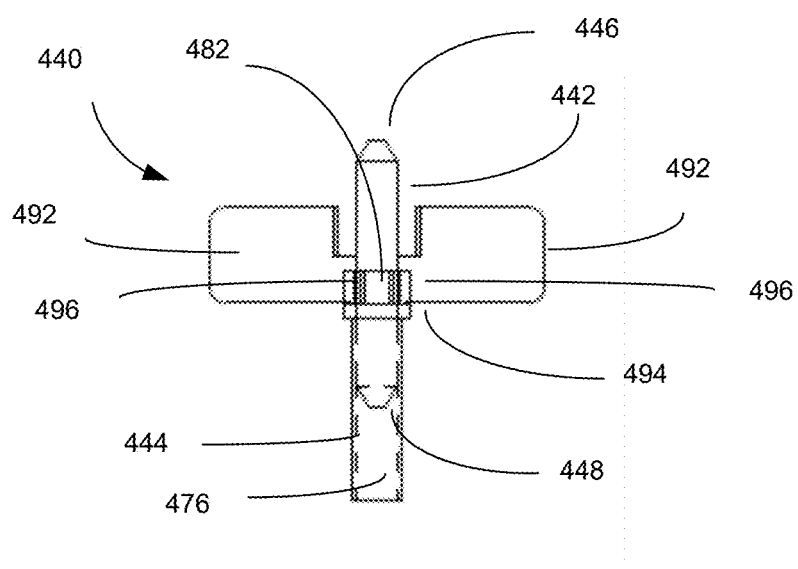
FIG. 4G is a side view of the replaceable portion of the third coupler, according to various embodiments of the present technology.

FIG. 4G illustrates a side view of the replaceable portion 440, according to various embodiments of the present technology. The ferrule 442 can be secured in the sleeve 444. The end 446 of the ferrule 442 can extend outside of the sleeve 444. Features inside of the sleeve 444 are shown with dotted lines. The end 448 of the ferrule 442 can be positioned within the sleeve 444. The sleeve 444 can include a space 476 into which an internal ferrule of an internal fiber optic connector of the test device can be inserted. The bracket 494 can be longitudinally positioned along the ferrule 442 so that the bracket 494 and the arms 496 can coincide with the notch 482. The bracket 494 can extend longitudinally to abut the sleeve 444. The bracket 494 can extend radially past the outer circumferential surface of the sleeve 444.

Figure 4H:
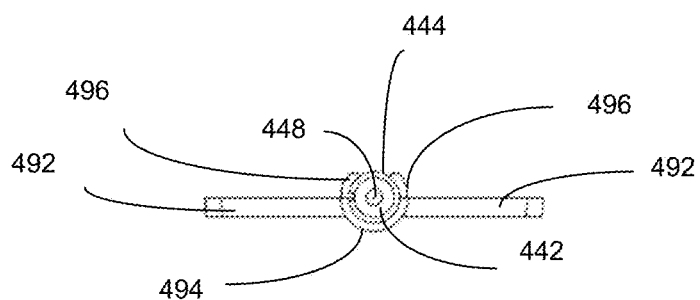
FIG. 4H is a bottom view of the replaceable portion of the third coupler, according to various embodiments of the present technology.

FIG. 4H illustrates a bottom view of the replaceable portion 440, according to various embodiments of the present technology. The end 448 of the ferrule 442 is accessible inside the sleeve 444. The wings 492 can be oriented orthogonally from a longitudinal axis of the ferrule 442. The arms 496 can extend from the bracket 494 in a circular fashion and partially wrap around the ferrule 442.

Figure 4I:
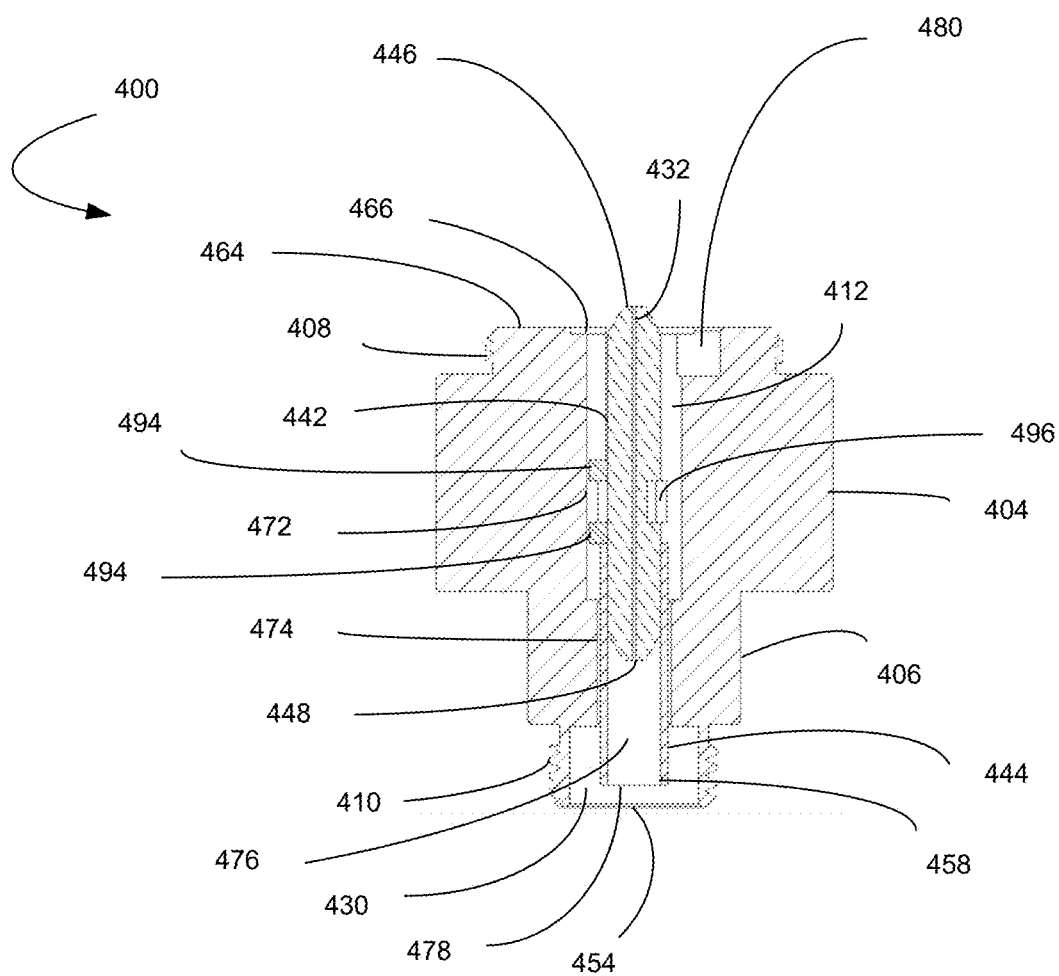
FIG. 4I is a sectional view taken along the line A-A of FIG. 4C, according to various embodiments of the present technology.

FIG. 4I illustrates a sectional view taken along the line A-A of FIG. 4C, according to various embodiments of the present technology. The end 446 of the ferrule 442 can be accessible beyond the annular surface 464 and the circular recess 466 of the end 408 to engage with a ferrule of an external fiber optic connector. The ferrule 442 can have a core 432. The ferrule 442 and the sleeve 444 of the replaceable portion 440 can be positioned within a portion 472 of the cavity 412 and a portion 474 of the cavity 412. The portion 472 and the portion 474 can be cylindrical. A diameter of the portion 472 can be larger than a diameter of the portion 474. A first portion of the replaceable portion 440 can be located within the portion 472 while a second portion of the replaceable portion 440 can be located within the portion 474. The end 458 of the sleeve 444 can be located within a space 430 formed by the end 410 and accessible through the opening 454. The end 458 of the sleeve 444 can have an opening 478 to the space 476 formed by the sleeve 444. The sleeve 444 can receive an internal ferrule of a fiber optic connector within the test device in the space 476 so that the internal ferrule can engage with the end 448 of the ferrule 442. The replaceable portion 440 can be positioned in the body 402 based on alignment between the index 480 and the notch 482 of the ferrule 442. Two portions of the bracket 494 and the arm 496 can hold the ferrule 442.

FIG. 5 illustrates an example method 500, according to various embodiments of the present technology. It should be appreciated that there can be additional, fewer, or alternative steps performed in similar or alternative orders, or in parallel, within the scope of the various embodiments discussed herein unless otherwise stated.

At block 502, the method 500 can handle a test device comprising a coupler, attached to a panel of the test device, comprising: a) a body comprising: i) a first end couplable to an external connector comprising an external ferrule, ii) a second end couplable to an internal connector, comprising an internal ferrule, of the test device, and iii) a cavity; and b) a first replaceable portion comprising a replaceable ferrule, the first replaceable portion positioned in the cavity. At block 504, the method 500 can manually remove the first replaceable portion comprising the replaceable ferrule from the body. At block 506, the method 500 can manually insert a second replaceable portion having the same design as the first replaceable portion into the body so that a replaceable ferrule of the second replaceable portion is engaged with the internal ferrule of the test device, the test device operable to conduct a test of a fiber optic network after insertion of the second replaceable portion into the body. It is contemplated that there can be many other uses, applications, and/or variations associated with the various embodiments of the present technology.

The terms "coupled", "coupling", "couplable", or the like as used herein can have different meanings depending in the context in which these terms are used. For example, the terms "coupled", "coupling", "couplable", or the like can indicate that two elements, components, or devices are directly connected or connectable to one another, or connected or connectable to one another through one or more intermediate elements, components, or devices depending on the particular context.

Reference in this specification to "one embodiment," "an embodiment," "other embodiments," "another embodiment," "in various embodiments," or the like means that a particular feature, design, structure, or characteristic described in connection with the embodiment is included in at least one embodiment of the technology. The appearances of, for example, the phrases "according to an embodiment," "in one embodiment," "in an embodiment," "in various embodiments," or "in another embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments but also variously omitted in other embodiments. Similarly, various features are described which may be preferences or requirements for some embodiments but not other embodiments.

Although embodiments have been described with reference to specific exemplary embodiments, it will be evident that the various modifications and changes can be made to these embodiments. Accordingly, the specification and drawings are to be regarded in an illustrative sense rather than in a restrictive sense. The foregoing specification provides a description with reference to specific exemplary embodiments. It will be evident that various modifications can be made thereto without departing from the broader spirit and scope as set forth in the following claims. The specification and drawings are, accordingly, to be regarded in an illustrative sense rather than a restrictive sense.

It should also be understood that a variety of changes may be made without departing from the essence of the invention. Such changes are also implicitly included in the description. They still fall within the scope of this invention. It should be understood that this technology is intended to yield a patent covering numerous aspects of the invention, both independently and as an overall system, and in both method and apparatus modes.

Further, each of the various elements of the invention and claims may also be achieved in a variety of manners. This technology should be understood to encompass each such variation, be it a variation of an embodiment of any apparatus embodiment, a method or process embodiment, or even merely a variation of any element of these.

Further, the use of the transitional phrase "comprising" is used to maintain the "open-end" claims herein, according to traditional claim interpretation. Thus, unless the context requires otherwise, it should be understood that the term "comprise" or variations such as "comprises" or "comprising," are intended to imply the inclusion of a stated element or step or group of elements or steps, but not the exclusion of any other element or step or group of elements or steps. Such terms should be interpreted in their most expansive forms so as to afford the applicant the broadest coverage legally permissible in accordance with the following claims.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the technology of the embodiments of the invention is intended to be illustrative, but not limiting, of the scope of the invention, which is set forth in the following claims.

What is claimed is:

1. A coupler comprising:
a body comprising:
  a first end couplable to an external connector comprising an external ferrule,
  a second end couplable to an internal connector, comprising an internal ferrule, of a test device, and
  a cavity; and
a first replaceable portion comprising a replaceable ferrule, the first replaceable portion positioned in the cavity and manually replaceable with a second replaceable portion positionable in the cavity, wherein the first replaceable portion further comprises a sleeve securely fitted with the replaceable ferrule, wherein a first end of the removeable ferrule is contained in the sleeve, the sleeve comprising a space into which the internal ferrule of the test device is insertable.

2. The coupler of claim 1, wherein the coupler is attached to a panel of the test device.

3. The coupler of claim 1, wherein a first end of the replaceable ferrule is engageable with the external ferrule and a second end of the replaceable ferrule is engageable with the internal ferrule of the test device.

4. The coupler of claim 1, wherein a notch formed on an outer surface of the replaceable ferrule is alignable with an index formed on an outer surface of the first end of the body.

5. The coupler of claim 4, wherein a second end of the removeable ferrule extends beyond an annular surface of the first end, the second end grippable by fingers of a person in control of the test device to remove the first replaceable portion from the cavity.

6. The coupler of claim 5, wherein the annular surface includes a circular recess.

7. The coupler of claim 1, wherein the cavity comprises a first cylindrical portion having a first diameter and a second cylindrical portion having a second diameter different from the first diameter, the first replaceable portion positioned in the first portion and the second portion.

8. The coupler of claim 1, wherein the body further comprises a first portion adjacent to the first end and a second portion adjacent to the second end, the first portion having an outer circumferential surface with a first diameter and the second portion having an outer circumferential surface with a second diameter different from the first diameter.

9. The coupler of claim 1, wherein the first end comprises a threaded section couplable with the external connector through an adapter and the second end comprises a threaded section couplable with the internal connector.

10. The coupler of claim 1, further comprising the second replaceable portion after the first replaceable portion is replaced by the second replaceable portion in the cavity, the second replaceable portion having the same design as the first replaceable portion.

11. The coupler of claim 10, wherein the body further comprises a portion having an index, the removeable ferrule positioned in the cavity based on alignment of the index and an indentation formed on the removeable ferrule.

12. The coupler of claim 1, wherein the body further comprises a portion in which a pocket is formed and the replaceable portion further comprises a wing assembly positioned in the pocket.

13. The coupler of claim 12, wherein the wing assembly comprises wings that extend beyond a surface of the portion of the body, the wings grippable by fingers of a person in control of the test device to remove the first replaceable portion from the cavity.

14. A test device comprising:
a coupler, attached to a panel of the test device, comprising
a body comprising:
a first end couplable to an external connector comprising an external ferrule,
a second end couplable to an internal connector, comprising an internal ferrule, of the test device, and
a cavity; and
a first replaceable portion comprising a replaceable ferrule, the first replaceable portion positioned in the cavity and manually replaceable with a second replaceable portion positionable in the cavity, wherein the first replaceable portion further comprises a sleeve securely fitted with the replaceable ferrule, wherein a first end of the removeable ferrule is contained in the sleeve, the sleeve comprising a space into which the internal ferrule of the test device is insertable.

15. The device of claim 14, wherein the test device is an optical time domain reflectometer (OTDR) and the external connector is associated with a fiber optic network.

16. The device of claim 14, wherein a first end of the replaceable ferrule is engageable with the external ferrule and a second end of the replaceable ferrule is engageable with the internal ferrule of the test device.

17. A method comprising:
handling a test device comprising a coupler, attached to a panel of the test device, comprising: a) a body comprising: i) a first end couplable to an external connector comprising an external ferrule, ii) a second end couplable to an internal connector, comprising an internal ferrule, of the test device, and iii) a cavity; and b) a first replaceable portion comprising a replaceable ferrule, the first replaceable portion positioned in the cavity positionable in the cavity, wherein the first replaceable portion further comprises a sleeve securely fitted with the replaceable ferrule, wherein a first end of the removeable ferrule is contained in the sleeve, the sleeve comprising a space into which the internal ferrule of the test device is insertable; and
manually removing the first replaceable portion comprising the replaceable ferrule from the body.

18. The method of claim 17, further comprising manually inserting a second replaceable portion having the same design as the first replaceable portion into the body so that a replaceable ferrule of the second replaceable portion is engaged with the internal ferrule of the test device, the test device operable to conduct a test of a fiber optic network after insertion of the second replaceable portion into the body.

19. The method of claim 18, further comprising:
manually removing the second replaceable portion from the body; and
manually inserting a third replaceable portion having the same design as the first replaceable portion and the second replaceable portion into the body so that a replaceable ferrule of the third replaceable portion is engaged with the internal ferrule of the test device, the test device operable to conduct a second test of the fiber optic network after insertion of the third replaceable portion into the body.

20. The coupler of claim 1, wherein the terminal end of a second end of the removeable ferrule extends beyond the sleeve.

* * * * *